United States Patent
Zhang et al.

(10) Patent No.: US 11,908,039 B2
(45) Date of Patent: Feb. 20, 2024

(54) GRAPHICS RENDERING METHOD AND APPARATUS, AND COMPUTER-READABLE STORAGE MEDIUM

(71) Applicant: HUAWEI TECHNOLOGIES CO., LTD., Shenzhen (CN)

(72) Inventors: Fan Zhang, Shenzhen (CN); Jiangzheng Wu, Hangzhou (CN); Xindong Shi, Hangzhou (CN); Shu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 17/484,523

(22) Filed: Sep. 24, 2021

(65) Prior Publication Data

US 2022/0012842 A1    Jan. 13, 2022

Related U.S. Application Data

(63) Continuation of application No. PCT/CN2020/080582, filed on Mar. 23, 2020.

(30) Foreign Application Priority Data

Mar. 26, 2019    (CN) .......................... 201910231774.8

(51) Int. Cl.
*G06T 15/00* (2011.01)
*G06T 1/20* (2006.01)

(52) U.S. Cl.
CPC .............. *G06T 1/20* (2013.01); *G06T 15/005* (2013.01); *G06T 2210/52* (2013.01)

(58) Field of Classification Search
CPC ....... G06T 15/00; G06T 15/005; G06T 15/20; G06T 1/20; G06T 2210/52; G06T 2200/28; G06F 1/329; G06F 9/50
See application file for complete search history.

(56) References Cited

U.S. PATENT DOCUMENTS

2001/0045958 A1 * 11/2001 Hochmuth ............... G06F 3/14
  345/506
2010/0329564 A1    12/2010 Hervas et al.
(Continued)

FOREIGN PATENT DOCUMENTS

CN    101540056 A    9/2009
CN    101706741 A    5/2010
(Continued)

OTHER PUBLICATIONS

Extended European Search Report issued in corresponding European Application No. 20778929.8, dated May 13, 2022, pp. 1-8.
(Continued)

*Primary Examiner* — Hau H Nguyen
(74) *Attorney, Agent, or Firm* — HAUPTMAN HAM, LLP

(57) ABSTRACT

A graphics rendering method includes obtaining, by a central processing unit (CPU), to-be-processed vertex data. The to-be-processed vertex data is vertex data used by a graphics processing unit (GPU) for graphics rendering processing. The method also includes processing, by the CPU, the to-be-processed vertex data to obtain vertex data within a field of view of a user. The method additionally includes sending, by the CPU, the vertex data within the field of view of the user to the GPU for the graphics rendering processing.

20 Claims, 11 Drawing Sheets

(56) References Cited

U.S. PATENT DOCUMENTS

| | | | |
|---|---|---|---|
| 2014/0052965 | A1 | 2/2014 | Sarel |
| 2018/0211434 | A1 | 7/2018 | Nijasure et al. |
| 2018/0232915 | A1 | 8/2018 | James et al. |
| 2019/0354174 | A1* | 11/2019 | Young .................... G06F 3/015 |

FOREIGN PATENT DOCUMENTS

| | | |
|---|---|---|
| CN | 102147722 A | 8/2011 |
| CN | 103473814 A | 12/2013 |
| CN | 105678680 A | 6/2016 |
| CN | 105741228 A | 7/2016 |
| CN | 107464276 A | 12/2017 |
| CN | 108711182 A | 10/2018 |
| CN | 109509139 A | 3/2019 |
| EP | 2812802 A1 | 12/2014 |
| IN | 107223264 A | 9/2017 |

OTHER PUBLICATIONS

International Search Report issued in corresponding International Application No. PCT/CN2020/080582, dated Jun. 19, 2020, pp. 1-10.

Chinese Office Action issued in corresponding Chinese Application No. 201910231774.8, dated Nov. 16, 2023, pp. 1-9.

\* cited by examiner

GRAPHICS RENDERING METHOD AND APPARATUS, AND COMPUTER-READABLE STORAGE MEDIUM

CROSS-REFERENCE TO RELATED APPLICATIONS

This application is a continuation of International Application No. PCT/CN2020/080582, filed on Mar. 23, 2020, which claims priority to Chinese Patent Application No. 201910231774.8, filed on Mar. 26, 2019. The disclosures of the aforementioned applications are hereby incorporated by reference in their entireties.

TECHNICAL FIELD

This application relates to the field of image processing technologies, and more specifically, to a graphics rendering method and apparatus, and a computer-readable storage medium.

BACKGROUND

A graphics processing unit (graphics processing unit, GPU) is a microprocessor dedicated to an image operation, and is often used for graphics rendering.

In a conventional solution, during graphics rendering, an entire image rendering process is usually performed by a GPU. However, in some cases, for example, when there is a relatively large operation amount of graphics rendering (for example, in a case of heavy graphics display) or a GPU needs to process a relatively large quantity of other operations (for example, the GPU further participates in large scientific computing while performing graphics rendering), if the conventional solution is used to perform graphics rendering, load of the GPU is excessively high, affecting performance of the GPU during image rendering.

SUMMARY

This application provides a graphics rendering method and apparatus, and a computer-readable storage medium, to reduce load of a GPU during graphics rendering.

According to a first aspect, a graphics rendering method is provided. The method includes: a central processing unit CPU obtains to-be-processed vertex data, where the to-be-processed vertex data is vertex data used by a graphics processing unit GPU for graphics rendering processing; the CPU processes the to-be-processed vertex data to obtain vertex data within a field of view of a user; and the CPU sends the vertex data within the field of view of the user to the graphics processing unit GPU for graphics rendering processing.

The to-be-processed vertex data may be all vertex data or some vertex data required for one time of graphics drawing. In addition to the vertex data within the field of view of the user, the to-be-processed vertex data may further include vertex data outside the field of view of the user. Processing, by the CPU, the to-be-processed vertex data to obtain the vertex data within the field of view of the user is equivalent to removing the vertex data outside the field of view of the user from the to-be-processed vertex data to obtain the vertex data within the field of view of the user.

It should be understood that the vertex data within the field of view of the user may be vertex location information of an object image visible within the field of view of the user, and the object image visible within the field of view of the user can be finally obtained by processing the vertex data within the field of view of the user.

The to-be-processed vertex data obtained by the CPU may be vertex data in a local coordinate system.

Optionally, the to-be-processed vertex data is vertex data captured by one draw call instruction used to render one frame of image.

The draw call instruction is a graphics application programming interface instruction, a quantity of draw call instructions is the same as a quantity of graphics drawing times of a cross-platform graphics application programming interface, and the draw call instruction specifically includes a glDrawArrays instruction, a glDrawElements instruction, or the like.

When the to-be-processed vertex data is vertex data captured by one draw call instruction used to render one frame of image, the vertex data can be flexibly captured by using the draw call instruction, and then the vertex data can be flexibly processed by using the CPU.

Optionally, the to-be-processed vertex data obtained by the CPU is some or all vertex data stored in a storage module.

For example, the storage module currently stores vertex data corresponding to multiple draw calls. In this case, when obtaining the vertex data, the CPU may obtain vertex data corresponding to one draw call from the storage module as the to-be-processed vertex data.

The storage module may be specifically a double data rate synchronous dynamic random access memory (double data rate synchronous dynamic random access memory, DDR SDRAM) or a video RAM. Specifically, when the graphics rendering method is executed by a terminal device, the storage module may be a DDR SDRAM inside the terminal device; or when the graphics rendering method is executed by a computer device, the storage module may be a video RAM inside the computer device.

In this application, a processing process of the to-be-processed vertex data for which the GPU is originally responsible is transferred to the CPU for execution, which can reduce load of the GPU during graphics rendering and improve graphics rendering efficiency.

With reference to the first aspect, in some implementations of the first aspect, that a CPU obtains to-be-processed vertex data includes: the CPU obtains the to-be-processed vertex data from the storage module.

In this application, the CPU can obtain the to-be-processed vertex data from a cache module, and therefore can process the to-be-processed vertex data originally processed by the GPU, which can reduce load of the GPU.

With reference to the first aspect, in some implementations of the first aspect, that the CPU sends the vertex data within the field of view of the user to the GPU for rendering processing includes: the CPU stores the vertex data within the field of view of the user in the storage module, so that the GPU obtains the vertex data within the field of view of the user from the storage module and performs image rendering processing.

In this application, the CPU stores the processed vertex data within the field of view of the user in a memory, so that the GPU can obtain the vertex data within the field of view of the user from the cache module and then complete the subsequent graphics rendering processing.

Before processing the to-be-processed vertex data, the CPU may copy the to-be-processed vertex data from the memory. After processing the to-be-processed vertex data, the CPU replaces the to-be-processed vertex data stored in the memory with the vertex data within the field of view of the user.

Optionally, that a CPU obtains to-be-processed vertex data includes: before the to-be-processed vertex data is processed by the GPU, the CPU intercepts the to-be-processed vertex data; and that the CPU sends the vertex data within the field of view of the user to the GPU for graphics rendering processing includes: the CPU replaces the to-be-processed vertex data with the vertex data within the field of view of the user.

In this application, the CPU intercepts the to-be-processed vertex data that the GPU is originally responsible for processing and transfers a part of a processing process of the to-be-processed vertex data to the CPU for execution, which can reduce load of the GPU during graphics rendering and then improve graphics rendering efficiency.

With reference to the first aspect, in some implementations of the first aspect, before the CPU processes the to-be-processed vertex data, the method further includes: the CPU determines, based on at least one of the to-be-processed vertex data, a load amount of the CPU, and a load amount of the GPU, whether to process the vertex data.

Optionally, the CPU may determine, based on at least one of an amount of the to-be-processed vertex data, a size of the load amount of the CPU, and a size of the load amount of the GPU, to process the to-be-processed vertex data.

The amount of the to-be-processed vertex data may be a quantity (an amount) of pieces of the to-be-processed vertex data. In addition, the amount of the to-be-processed vertex data may alternatively be a quantity of vertices corresponding to the vertex data.

With reference to the first aspect, in some implementations of the first aspect, that the CPU determines, based on at least one of the to-be-processed vertex data, a load amount of the CPU, and a load amount of the GPU, to process the to-be-processed vertex data includes:

when at least one of the following cases occurs, the CPU determines to process the to-be-processed vertex data:

the amount of the to-be-processed vertex data is greater than or equal to a first amount threshold;

a current load amount of the CPU is less than a first load amount threshold; and a current load amount of the GPU is greater than or equal to a second load amount threshold.

In this application, when the amount of the to-be-processed vertex data is relatively large, the to-be-processed vertex data is processed by the CPU, which can greatly reduce load of the GPU compared with a manner in which all the to-be-processed vertex data is processed by the GPU.

In this application, when the current load amount of the CPU is relatively small, the to-be-processed vertex data is transferred to the CPU for processing, which can achieve a balance between the CPU and the GPU, and reduce a load amount of the GPU without bringing too heavy load to the CPU.

In this application, when the load amount of the GPU is relatively large, the to-be-processed vertex data is transferred to the CPU for processing, which reduces load of the GPU.

Optionally, that the CPU determines, based on at least one of the to-be-processed vertex data, a load amount of the CPU, and a load amount of the GPU, whether to process the vertex data includes:

when the following case occurs, the CPU determines not to process the to-be-processed vertex data:

the amount of the to-be-processed vertex data is less than the first amount threshold;

a current load amount of the CPU is greater than or equal to the first load amount threshold; and a current load amount of the GPU is less than the second load amount threshold.

In this application, when the amount of the to-be-processed vertex data is relatively small, the load amount of the CPU is relatively large, and the load amount of the GPU is relatively small, the to-be-processed vertex data may still be processed by the GPU, which can simplify a graphics rendering processing procedure.

Optionally, the current load amount of the CPU is a current total load amount of the CPU.

The current total load amount of the CPU may be a current sum of load amounts of all cores in the CPU.

Optionally, the current load amount of the CPU is a current load amount of a CPU core.

The current load amount of the CPU core may be an average value of current load amounts of cores in the CPU, or may be a current load amount of any core in the CPU.

When the current load amount of the CPU is a current load amount of a specific core in the CPU, that a current load amount of the CPU is less than a first load threshold may mean that a current load amount of each core in the CPU is less than the first load threshold.

With reference to the first aspect, in some implementations of the first aspect, the to-be-processed vertex data is the vertex data in the local coordinate system, and that the CPU processes the to-be-processed vertex data to obtain vertex data within a field of view of a user includes: the CPU performs coordinate conversion on the vertex data in the local coordinate system based on auxiliary data to obtain vertex data in a clip coordinate system, where the auxiliary data includes a transformation matrix for performing coordinate transformation on the vertex data in the local coordinate system; and the CPU performs clipping and removal operations on the vertex data in the clip coordinate system to obtain the vertex data within the field of view of the user.

Optionally, before the CPU performs coordinate conversion on the vertex data in the local coordinate system based on the auxiliary data, the CPU may further obtain the auxiliary data.

The CPU needs to perform coordinate transformation on the vertex data in the local coordinate system based on the auxiliary data. Therefore, if the CPU does not obtain the auxiliary data before processing the vertex data, the vertex data may alternatively be processed by the GPU.

With reference to the first aspect, in some implementations of the first aspect, the auxiliary data includes an MVP matrix, and that the CPU performs coordinate conversion on the vertex data in the local coordinate system based on auxiliary data to obtain vertex data in a clip coordinate system includes: the CPU performs coordinate conversion on the vertex data in the local coordinate system based on the MVP matrix to obtain the vertex data in the clip coordinate system, where the MVP matrix is a product of a model matrix, a view matrix, and a projection matrix.

Optionally, the MVP matrix is obtained by the CPU before the CPU performs coordinate conversion on the vertex data in the local coordinate system.

In this application, the CPU may transform the vertex data from the local coordinate system to the clip coordinate system through one time of coordinate transformation based on the MVP matrix, which can improve coordinate transformation efficiency.

With reference to the first aspect, in some implementations of the first aspect, the CPU includes M cores, and that the CPU processes the to-be-processed vertex data includes: when the amount of the to-be-processed vertex data is less than a second amount threshold, the CPU allocates the to-be-processed vertex data to a single core in the CPU for processing; or when the amount of the to-be-processed vertex data is greater than or equal to the second amount threshold, the CPU allocates the to-be-processed vertex data to N cores in the CPU for processing.

The second amount threshold is greater than the first amount threshold, both M and N are integers greater than 1, and N is less than or equal to M.

Specifically, when allocating the to-be-processed vertex data to a core in the CPU for processing, the CPU may separately enable one thread to specify, by using an interface, some cores to process the to-be-processed vertex data.

In this application, the to-be-processed vertex data can be reasonably allocated to the single core or the multiple cores in the CPU for processing based on the amount of the to-be-processed vertex data, so that load of the cores in the CPU is balanced as much as possible.

With reference to the first aspect, in some implementations of the first aspect, that the CPU allocates the to-be-processed vertex data to N cores in the CPU for processing includes: the CPU evenly allocates the to-be-processed vertex data to the N cores in the CPU for processing.

In this application, the to-be-processed vertex data is evenly allocated to the multiple cores in the CPU, so that load of each core is not excessively high. This avoids, as much as possible, a case in which load of a specific core in the CPU is excessively high.

With reference to the first aspect, in some implementations of the first aspect, a current average load amount of the N cores is less than a current average load amount of N-M cores, and the N-M cores are cores other than the N cores in the CPU.

In this application, the to-be-processed vertex data is allocated to several cores with relatively small current load amounts in the CPU for processing, so that load of some cores in the CPU is not excessively high.

Optionally, that the CPU allocates the to-be-processed vertex data to a single core in the CPU for processing includes: the CPU allocates the to-be-processed vertex data to a core with smallest current core load in the CPU for processing.

According to a second aspect, a graphics rendering apparatus is provided. The apparatus includes modules corresponding to the method/operations/steps/actions described in the first aspect.

The apparatus may be an electronic device, or may be an apparatus (for example, a chip, or an apparatus that can match the electronic device for use) configured to perform graphics rendering in the electronic device.

The module included in the graphics rendering apparatus may be implemented by using a hardware circuit, software, or a combination of a hardware circuit and software.

According to a third aspect, a graphics rendering apparatus is provided. The apparatus includes a processor, and the processor is configured to invoke program code stored in a memory, to execute some or all operations in any one of the first aspect or the manners of the first aspect.

In the third aspect, the memory storing the program code may be located inside the graphics rendering apparatus (the graphics rendering apparatus may further include the memory in addition to the processor), or may be located outside the graphics rendering apparatus (may be a memory in another device).

Optionally, the memory is a nonvolatile memory.

When the graphics rendering apparatus includes the processor and the memory, the processor and the memory may be coupled together.

According to a fourth aspect, a graphics rendering apparatus is provided. The apparatus includes a central processing unit CPU, an input/output interface, and a memory.

The CPU may obtain to-be-processed vertex data by using the input/output interface. After obtaining the to-be-processed vertex data, the CPU processes the to-be-processed vertex data to obtain vertex data within a field of view of a user, and sends the vertex data within the field of view of the user to the GPU for graphics rendering processing.

The to-be-processed vertex data is vertex data used by the GPU for graphics rendering processing. The GPU may be located inside the graphics rendering apparatus, or may be located in a device other than the graphics rendering apparatus.

According to a fifth aspect, a computer-readable storage medium is provided. The computer-readable storage medium stores program code, and the program code includes instructions used to execute some or all operations of the method described in the first aspect.

Optionally, the computer-readable storage medium is located inside an electronic device, and the electronic device may be an apparatus that can perform graphics rendering.

According to a sixth aspect, an embodiment of this application provides a computer program product. When the computer program product runs on a communications apparatus, the communications apparatus is enabled to execute some or all operations of the method described in the first aspect.

According to a seventh aspect, a chip is provided. The chip includes a processor, and the processor is configured to execute some or all operations of the method described in the first aspect.

DESCRIPTION OF EMBODIMENTS

The following describes technical solutions in this application with reference to accompanying drawings.

A graphics rendering method in the embodiments of this application may be executed by an electronic device. The electronic device may be a mobile terminal (for example, a smartphone), a computer, a personal digital assistant, a wearable device, a vehicle-mounted device, an Internet of things device, or another device that can perform image rendering processing. The electronic device may be a device that runs an Android system, an IOS system, a windows system, or another system.

Various thresholds (a first amount threshold, a second data amount threshold, a first load amount threshold, and a second load amount threshold) in this application may be set based on experience, or may be comprehensively determined based on a size of an amount of data processed during graphics rendering.

The graphics rendering method in the embodiments of this application may be executed by an electronic device. A specific structure of the electronic device may be shown in FIG. 1. The following describes the specific structure of the electronic device in detail with reference to FIG. 1.

Figure 1:
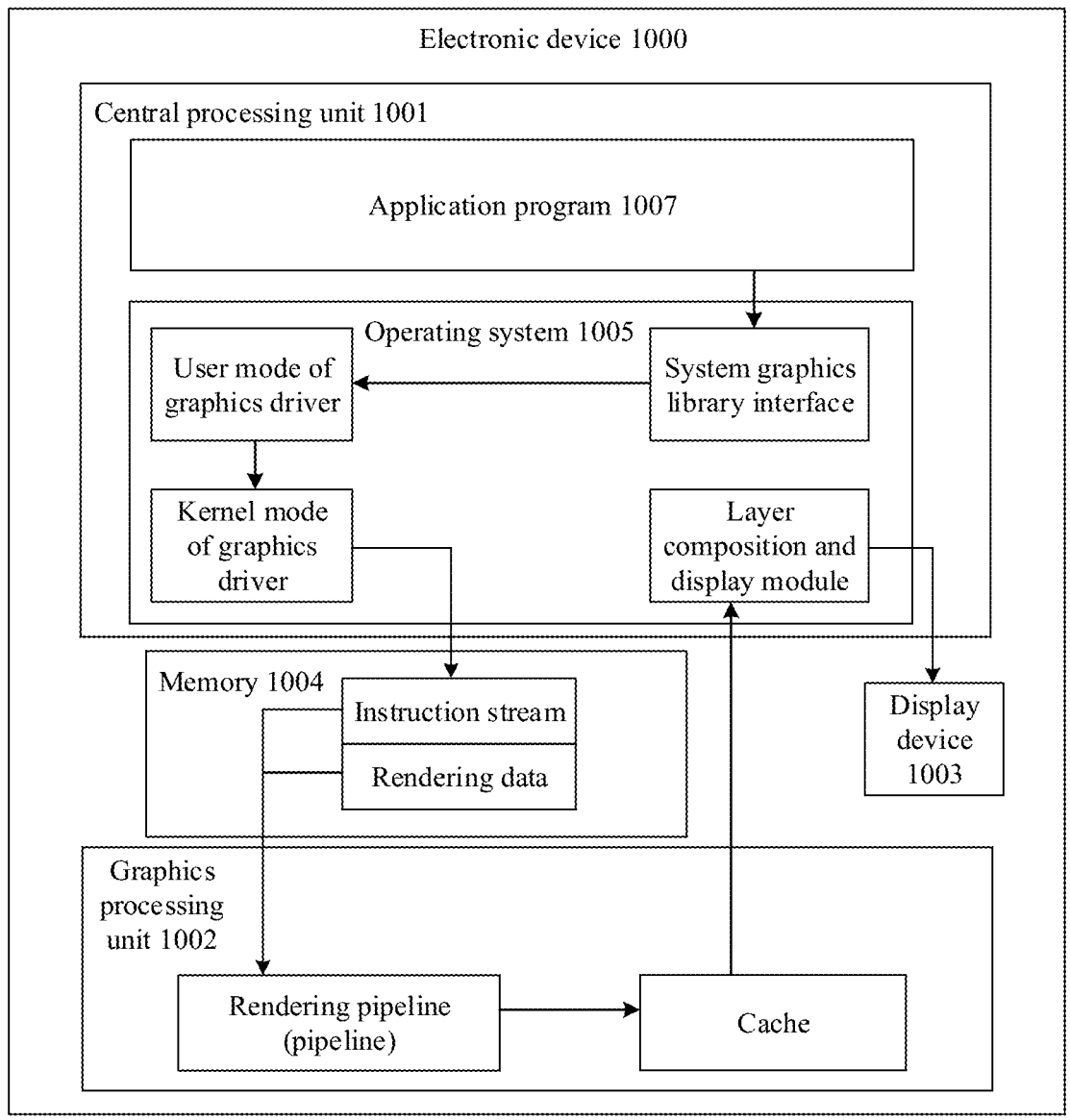
FIG. 1 is a schematic flowchart of a graphics rendering method according to an embodiment of this application.

In an embodiment, as shown in FIG. 1, an electronic device 1000 may include a central processing unit (CPU) 1001, a graphics processing unit (GPU) 1002, a display device 1003, and a memory 1004. Optionally, the electronic device 10 may further include at least one communications bus 110 (not shown in FIG. 1), configured to implement connection and communication between the components.

It should be understood that the components in the electronic device 1000 may alternatively be mutually coupled by using another connector, and the another connector may include various interfaces, transmission lines, buses, or the like. Alternatively, the components in the electronic device 1000 may be radioactively connected with the processor 1001 as a center. In the embodiments of this application, coupling is mutual electrical connection or communication, including direct connection or indirect connection performed by using another device.

The central processing unit 1001 and the graphics processing unit 1002 may also be connected in multiple manners, and are not limited to being connected in the manner shown in FIG. 1. The central processing unit 1001 and the graphics processing unit 1002 in the electronic device 1000 may be located on a same chip, or may be located on separate chips.

The following briefly describes functions of the central processing unit 1001, the graphics processing unit 1002, the display device 1003, and the memory 1004.

The central processing unit 1001 is configured to run an operating system 1005 and an application program 1007. The application program 1007 may be a graphical application program, such as a game or a video player. The operating system 1005 provides a system graphics library interface. The application program 1007 generates an instruction stream used to render a graphic or an image frame and required related rendering data by using the system graphics library interface and a driver program provided by the operating system 1005, for example, a user-mode graphics driver and/or a kernel-mode graphics driver. A system graphics library includes but is not limited to a system graphics library, for example, an open graphics library for embedded systems (open graphics library for embedded system, OpenGL ES), the khronos platform graphics interface (the khronos platform graphics interface), or Vulkan (a cross-platform drawing application programming interface). The instruction stream includes a series of instructions, and these instructions are usually instructions for calling the system graphics library interface.

Optionally, the central processing unit 1001 may include at least one of the following types of processors: an application processor, one or more microprocessors, a digital signal processor (digital signal processor, DSP), a microcontroller (microcontroller unit, MCU), an artificial intelligence processor, or the like.

The central processing unit 1001 may further include a necessary hardware accelerator, such as an application-specific integrated circuit (application specific integrated circuit, ASIC), a field programmable gate array (field programmable gate array, FPGA), or an integrated circuit configured to implement a logical operation. The processor 1001 may be coupled to one or more data buses, configured to transmit data and instructions between the components in the electronic device 10.

The graphics processing unit 1002 is configured to: receive a graphics instruction stream sent by the processor 1001, generate a rendering target by using a rendering pipeline (pipeline), and display the rendering target on the display device 1003 by using a layer composition and display module in the operating system.

Optionally, the graphics processing unit 1002 may include a general-purpose graphics processing unit that executes software, such as a GPU or another type of dedicated graphics processing unit.

The display device 1003 is configured to display various images generated by the electronic device 10. The image may be a graphical user interface (graphical user interface, GUI) in the operating system or image data (including a still image and video data) processed by the graphics processing unit 1002.

Optionally, the display device 1003 may include any suitable type of display screen, such as a liquid crystal display (liquid crystal display, LCD), a plasma display, or an organic light-emitting diode (organic light-emitting diode, OLED) display.

The memory 1004 is a transmission channel between the central processing unit 1001 and the graphics processing unit 1002, and may be a double data rate synchronous dynamic random access memory (double data rate synchronous dynamic random access memory, DDR SDRAM) or another type of cache.

The rendering pipeline is a series of operations sequentially performed by the graphics processing unit 1002 in a graphic or an image frame rendering process. Typical operations include vertex processing (Vertex Processing), primitive processing (Primitive Processing), rasterization (Rasterization), fragment processing (Fragment Processing), and the like.

The graphics rendering method in the embodiments of this application relates to coordinate system conversion of vertex data and clipping and removal operations of the vertex data. The following first briefly describes related basic concepts.

A vertex data processing process relates to five different coordinate systems:
- a local space (Local Space, or referred to as an object space (Object Space));
- a world space (World Space);
- a view space (View Space, or referred to as an eye space (Eye Space));
- a clip space (Clip Space); and
- a screen space (Screen Space).

To transform coordinates (of vertex data) from a coordinate system to another coordinate system, several transformation matrices are usually needed, and most important transformation matrices are three matrices: a model (Model) matrix, a view (View) matrix, and a projection (Projection) matrix. The coordinates of the vertex data usually start from the local space (Local Space). Herein, coordinates in the local space are referred to as local coordinates (Local Coordinate). After being transformed, the local coordinates are sequentially changed into world coordinates (World Coordinate), view coordinates (View Coordinate), and clip coordinates (Clip Coordinate), and a coordinate transformation process finally ends in a form of screen coordinates (Screen Coordinate).

In the coordinate transformation process, the local coordinates are coordinates of an object relative to a local origin, and are also start coordinates of the object. Next, the local coordinates are transformed into the world space coordinates. The world space coordinates fall within a larger space range. These coordinates are relative to a global origin of a world, and are placed together with those of another object relative to the origin of the world. Then, the world coordinates are transformed into the view space coordinates, so that each coordinate is viewed from an angle of a camera or a viewer. When reaching the view space, the vertex coordinates need to be projected into the clip coordinates. The clip coordinates are processed into coordinates within a range from −1.0 to 1.0, and vertices that are to appear on a screen are determined. Finally, the clip coordinates are transformed into the screen coordinates. Next, a process referred to as viewport transform (Viewport Transform) is used. The viewport transform transforms the coordinates within the range from −1.0 to 1.0 to a coordinate range defined by a glViewport function. The finally transformed coordinates are sent to a rasterizer to convert the coordinates into segments (after the coordinates are converted into the segments, a video image can be displayed based on the segments).

In the foregoing process, vertices are transformed to various different spaces because some operations are meaningful and more convenient in specific coordinate systems. For example, when an object needs to be modified, it makes more sense to do the operation in the local space; or if an operation needs to be performed on an object relative to a location of another object, it makes more sense to do the operation in the world coordinate system. If desired, a transformation matrix for direct transformation from the local space to the clip space may alternatively be defined, but this loses a lot of flexibility.

Next, the coordinate systems are described in detail.

Local Space:

The local space is a coordinate space in which an object is located, namely, a place at which the object is initially located. For example, a cube is created in modeling software (for example, Blender). An origin of the created cube may be located in (0, 0, 0), even though it is likely that the created cube is finally located in a completely different location in a program. Even, it is likely that (0, 0, 0) is used as initial locations for all created models (however, the created models finally appear in different locations in the world). Therefore, all vertices of the created model are in the local space: the vertices are local to the object.

World Space:

If all objects are imported into a program, all the objects may be centralized on an origin (0, 0, 0) of a world. This is not desired. One location needs to be defined for each object, so that the objects can be placed in a larger world. As the name suggests, coordinates in the world space are coordinates of a vertex relative to the (game) world. If the objects need to be scattered in the world (especially in a very real form), the world space is a space to which the objects need to be transformed. Coordinates of the objects are to be transformed from the local to the world space. The transformation is implemented by using a model matrix (Model Matrix).

The model matrix is a transformation matrix that can displace, scale, or rotate an object to place the object in a location or an orientation in which the object originally should be. For example, if a house needs to be transformed, the house first needs to be scaled down (the house is too large in the local space) and displaced to a small town in the suburbs, and then left rotated a little bit on a y axis to match a nearby house.

View Space:

The view space is often referred to as a camera (sometimes referred to as a camera space (Camera Space) or an eye Space (Eye Space)) of a cross-platform graphics application programming interface (open graphics library, OPENGL). The view space is a result generated by converting world space coordinates into coordinates in front of a field of view of a user. Therefore, the view space is a space viewed from a field of view of a camera. In this case, a panning/rotation scenario is usually completed by using a series of displacement and rotation combinations, to enable a specific object to be transformed to the front of the camera. These combined transformations are usually stored in a view matrix (View Matrix) used to transform the world coordinates to the view space.

Clip Space:

At the end of running of a vertex shader, an OPENGL expects that all coordinates can fall within a specific range, and any point outside this range should be clipped (Clipped). Clipped coordinates are ignored, and therefore remaining coordinates become visible segments on a screen. This is the name origin of the clip space (Clip Space).

Because it is not very intuitive that all visible coordinates are specified to fall within a range from −1.0 to 1.0, coordinate sets (Coordinate Set) may be specified and transformed back to a standardized device coordinate system, as expected by the OPENGL.

To transform vertex coordinates from the view to the clip space, a projection matrix (Projection Matrix) needs to be defined. The projection matrix specifies a range of coordinates, for example, −1000 to 1000, on each dimension. Then, the projection matrix transforms coordinates in this specified range to a standardized device coordinate range (−1.0, 1.0). All coordinates outside the range are not mapped to the range from −1.0 to 1.0, and therefore are clipped. Within the range specified by the projection matrix, coordinates (1250, 500, 750) are invisible because an x coordinate in the coordinates falls outside the range and is converted into a standardized device coordinate greater than 1.0 and therefore the coordinates are clipped.

For example, if only a part of a primitive (Primitive) such as a triangle exceeds a clipping volume (Clipping Volume), the OpenGL reconstructs the triangle as one or more triangles to enable the triangle to fit into the clipping range.

The coordinate transformation process may relate to orthographic projection and perspective projection. The following describes the two projection manners in detail.

Figure 2:
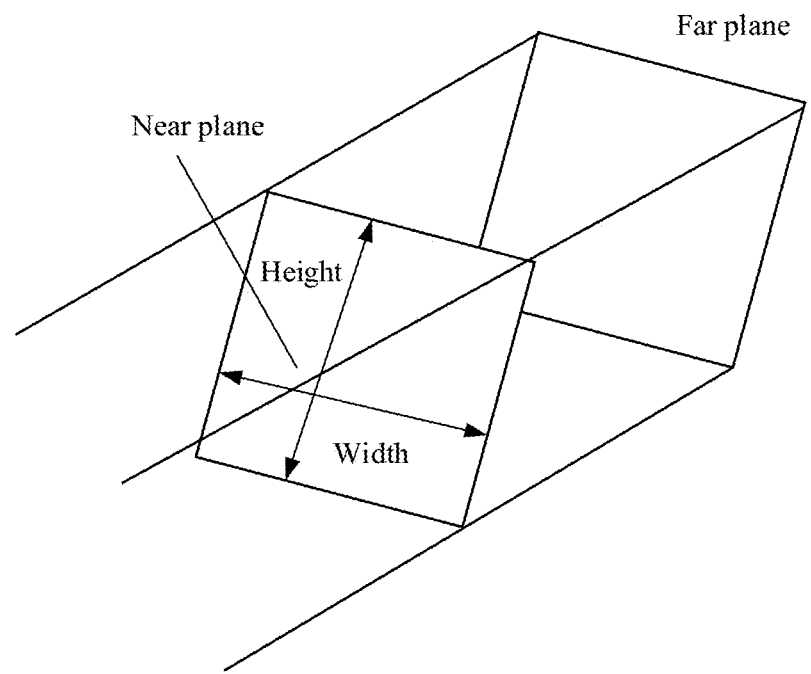
FIG. 2 is a schematic diagram of a frustum.

Orthographic Projection:

An orthographic projection matrix defines a cube-like frustum. The frustum defines a clip space. All vertices outside this space are clipped. To create an orthographic projection matrix, a width, a height, and a length of a visible frustum need to be specified. After coordinates are transformed to the clip space by using the orthographic projection matrix, all coordinates in this frustum are not clipped. The frustum of the orthographic projection matrix looks like a container:

As shown in FIG. 2, the frustum defines visible coordinates, and is specified by using a width, a height, a near (Near) plane, and a far (Far) plane. Any coordinates that appear in front of the near plane or behind the far plane are clipped. The orthographic frustum directly maps all coordinates within the frustum to standardized device coordinates, because a w component of each vector is not changed. If the w component is equal to 1.0, perspective division does not change the coordinates.

To create an orthographic projection matrix, a built-in function glm::ortho of a GLM may be used:

glm::ortho(0.0f, 800.0f, 0.0f, 600.0f, 0.1f, 100.0f).

The first two parameters specify left and right coordinates of a frustum, and the third and fourth parameters specify the bottom and top of the frustum. Sizes of a near plane and a far plane are defined by using the four parameters. Then, the fifth and sixth parameters define a distance between the near plane and the far plane. This projection matrix transforms coordinates within a range of these x, y, and z values into standardized device coordinates.

The orthographic projection matrix directly maps coordinates to a 2D plane, namely, a screen, but actually a direct projection matrix produces an unreal result because perspective (Perspective) is not considered in the projection. Therefore, a perspective projection matrix is needed to resolve this problem.

Figure 3:
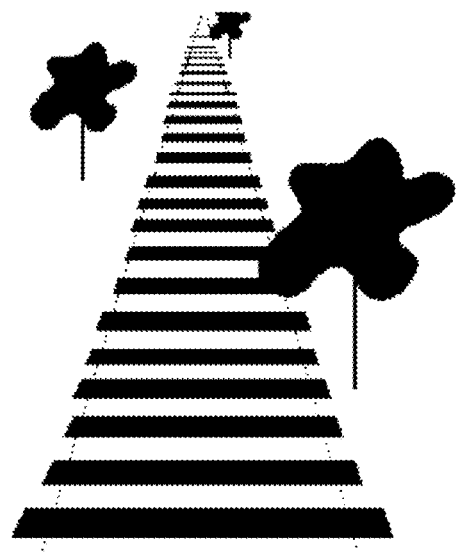
FIG. 3 is a schematic diagram of a perspective effect.

In FIG. 3, due to perspective, the two lines appear to intersect very far away. This is exactly an effect that the perspective projection wants to imitate, and is done by using a perspective projection matrix. This projection matrix maps a given frustum range to a clip space, and further modifies a w value of each vertex coordinates, so that vertex coordinates farther away from a viewer have a larger w component. All coordinates falling within the clip space after transformation fall within a range from −w to w (any coordinates greater than this range are clipped). The OPENGL requires that all visible coordinates fall within a range from −1.0 to 1.0 as last output of the vertex shader. Therefore, once coordinates fall within the clip space, perspective division is applied to the clip space coordinates. Coordinates obtained by using the perspective division are shown in the following formula:

$$out = \begin{pmatrix} x/w \\ y/w \\ z/w \end{pmatrix}$$

Each component of the vertex coordinates is divided by a w component of the vertex coordinates, and smaller vertex coordinates are farther away from the viewer. This is another reason why the w component is very important. The w component can help perspective projection. Final result coordinates fall within a standardized device space.

In a GLM, a perspective projection matrix can be created as follows:

glm::mat4 proj=glm::perspective(glm::radians(45.0f), (float)width/(float)height, 0.1f, 100.0f).

The first parameter in the perspective projection matrix defines a value of fov representing a field of view (Field of View), and sets a size of a view space. If a real view effect is needed, the value of fov is usually set to 45.0f. However, if a doomsday style result is needed, the value of fov may be set to a larger value. The second parameter sets an aspect ratio obtained by dividing a width of a viewport by a height of the viewport. The third and fourth parameters set near and far planes of a frustum. Usually, a near distance is set to 0.1f, and a far distance is set to 100.0f. All vertices within the near and far planes and within the frustum are rendered.

Similarly, glm::perspective actually creates a large frustum that defines a visual space. Anything outside the frustum finally does not appear in a clip space volume and is clipped. A perspective frustum may be considered as an uneven-shaped box. Each coordinates inside the box are mapped to one point in a clip space.

In this application, the following coordinate transformation may be performed on vertex data: local coordinate system-→world coordinate system-→viewer coordinate system-→clip coordinate system, and then a clipping operation may be performed. A CPU side may perform a simplified clipping operation: clipping, based on a frustum (clipping body), vertex coordinates defined in a clip space (x, y, z, w).

Figure 4:
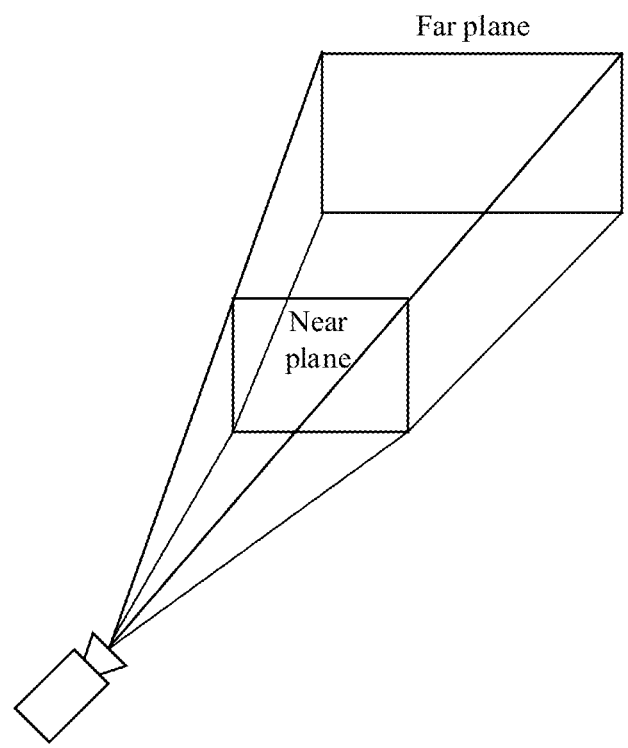
FIG. 4 is a schematic diagram of a clipping body.

As shown in FIG. 4, the clipping body is defined by six clipping planes. These planes are referred to as near, far, left, right, upper, and lower clipping planes. In clip coordinates, a coordinate value range of the clipping body is as follows:

−w<=x<=w;

−w<=y<=w; and

−w<=z<=w.

For the clipping body, clipping can be performed according to the following clipping rules:

Z-axis clipping: −w<=z<=w and w>0, and a vertex outside the range is clipped;

XY-axis line segment clipping: only a completely invisible object can be clipped; and back clipping: a back-faced primitive is clipped based on a primitive normal vector.

After the vertex data clipping is completed, clipped vertex data may be updated to vertex data. Specifically, after the clipping is completed, corresponding vertex (vertex) data and index (indices) data may be updated, and the data is sent to a rendering pipeline (pipeline) of a GPU as data input of a draw call instruction.

Figure 5:
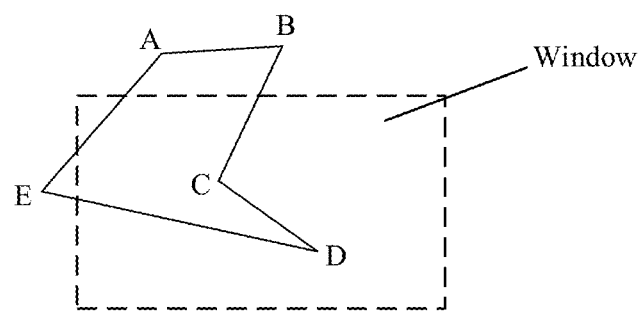
FIG. 5 is a schematic diagram of clipping.

In the embodiments of this application, a conservative clipping manner (for example, a simplified Cohen-Sutherland algorithm) may be used for clipping. As shown in FIG. 5, in the clipping manner, an AE line segment is not clipped or truncated to generate a new vertex, thereby simplifying a calculation amount.

Figure 6:
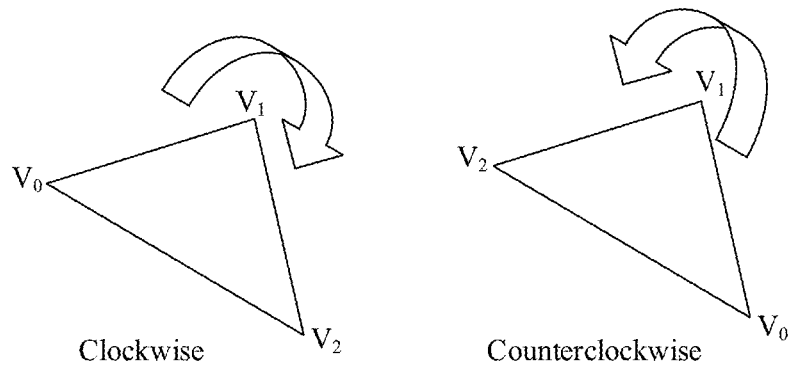
FIG. 6 is a schematic diagram of two triangles whose bending sequences are respectively clockwise and counterclockwise.

A removal operation is mainly discarding a triangle facing away from a viewer. To determine whether a triangle is front or back, a direction of the triangle needs to be first known. The direction of the triangle specifies a bending direction or a path sequence starting from the first vertex, passing through the second and third vertices, and finally returning to the first vertex. FIG. 6 shows an example of two triangles whose bending sequences are clockwise and counterclockwise. It is assumed that a counterclockwise triangle is a triangle facing a viewer and a clockwise triangle is a triangle facing away from the viewer (a specific triangle facing the viewer may be flexibly preset based on a program instruction (for example, an open gl instruction)). In this case, during the removal operation, the clockwise triangle may be retained while the counterclockwise triangle may be removed.

Figure 7:
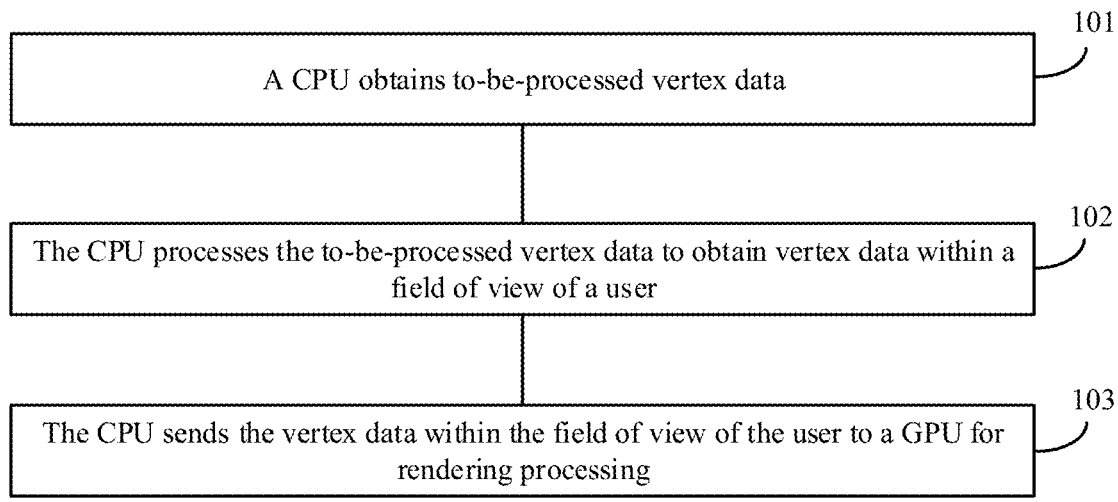
FIG. 7 is a schematic flowchart of graphics rendering according to an embodiment of this application.

FIG. 7 is a schematic flowchart of a graphics rendering method according to an embodiment of this application. The method shown in FIG. 7 may be executed by an electronic device. The method shown in FIG. 7 includes steps 101 to 103. The following separately describes these steps in detail.

101: A central processing unit (central processing unit, CPU) obtains to-be-processed vertex data.

The CPU may be located inside the electronic device. The to-be-processed vertex data may be vertex data obtained by the CPU from a cache module (cache unit) in the electronic device, and the to-be-processed vertex data is vertex data used by a GPU for graphics rendering processing.

The to-be-processed vertex data may be all vertex data or some vertex data required for one time of graphics drawing. In addition to vertex data within a field of view of a user, the to-be-processed vertex data may further include vertex data outside the field of view of the user. Processing, by the CPU, the to-be-processed vertex data to obtain the vertex data within the field of view of the user is equivalent to removing the vertex data outside the field of view of the user from the to-be-processed vertex data to obtain the vertex data within the field of view of the user.

It should be understood that the vertex data within the field of view of the user may be vertex location information of an object image visible within the field of view of the user, and the object image visible within the field of view of the user can be finally obtained by processing the vertex data within the field of view of the user.

Optionally, that a CPU obtains to-be-processed vertex data includes: the CPU obtains the to-be-processed vertex data from a storage module.

The storage module caches the to-be-processed vertex data used by the GPU for graphics rendering processing.

When the graphics rendering method is executed by a terminal device, the storage module may be a DDR SDRAM inside the terminal device; or when the graphics rendering method is executed by a computer device, the storage module may be a video RAM inside the computer device.

In this application, the CPU can also obtain the to-be-processed vertex data from the storage module, so that the CPU can also process the to-be-processed vertex data, thereby reducing load of the GPU.

In addition, the to-be-processed vertex data obtained by the CPU may be vertex data obtained by a specific draw call, and the vertex data obtained by the draw call may be vertex data required for one time of graphics drawing.

The draw call instruction is a graphics application programming interface instruction, a quantity of draw call instructions is the same as a quantity of graphics drawing times of a cross-platform graphics application programming interface, and the draw call instruction specifically includes a glDrawArrays instruction, a glDrawElements instruction, or the like.

When the to-be-processed vertex data is vertex data captured by one draw call instruction used to render one frame of image, the vertex data can be flexibly captured by using the draw call instruction, and then the vertex data can be flexibly processed by using the CPU.

102: The CPU processes the to-be-processed vertex data to obtain the vertex data within the field of view of the user.

It should be understood that the to-be-processed vertex data obtained in step 101 may be vertex data in a local coordinate system (or may be referred to as a local coordinate system, with an English name: local space). Therefore, in step 102, the CPU actually processes the vertex data in the local coordinate system to obtain the vertex data within the field of view of the user.

Local coordinates are coordinates of a rendered object relative to an object origin, and are also start coordinates of the object. When the object needs to be modified, it makes more sense to do the operation in the local space.

Optionally, in step 102, the processing the to-be-processed vertex data to obtain the vertex data within the field of view of the user specifically includes: the CPU performs coordinate conversion on the vertex data in the local coordinate system based on auxiliary data to obtain vertex data in a clip coordinate system; and the CPU performs clipping and removal operations on the vertex data in the clip coordinate system to obtain the vertex data within the field of view of the user.

The auxiliary data includes a transformation matrix for performing coordinate transformation on the vertex data in the local coordinate system.

The vertex data of the local coordinate system is converted to the clip coordinate system, so that clipping coordinates of the vertex data of the local coordinate system in the clip coordinate system can be transformed to a range [−0.1, 0.1], thereby facilitating subsequent determining of vertices that are to appear on a screen.

The clipping operation is performed in the clip coordinate system (clip space). A primitive within the field of view of the user may be referred to as a clipping body. The clipping body is defined by six clipping planes. These planes may be referred to as near, far, left, right, upper, and lower clipping planes. The clipping body may be defined as follows: $-w<=x<=w$, $-w<=y<=w$, and $-w<=z<=w$. During clipping, a primitive outside the clipping body may be deleted.

The removal operation is mainly discarding a primitive facing away from a viewer. To determine whether a primitive is front or back, a direction of the primitive needs to be first known. A triangle primitive is used as an example. A direction of a triangle specifies a bending direction or a path sequence starting from the first vertex, passing through the second and third vertices, and finally returning to the first vertex. For example, a triangle primitive whose bending sequence/direction is clockwise may be a primitive facing a viewer, and a triangle primitive whose bending direction is counterclockwise may be a primitive facing away from the viewer and the primitive needs to be removed.

Figure 8:
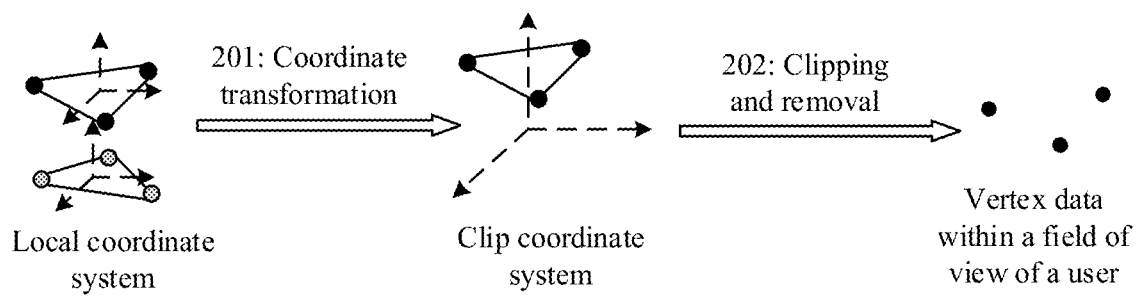
FIG. 8 is a schematic diagram of processing vertex data to obtain vertex data within a field of view of a user.

To better understand the foregoing coordinate transformation process, the following describes the coordinate transformation process with reference to FIG. 8.

As shown in FIG. 8, after the to-be-processed vertex data is obtained, the vertex data within the field of view of the user can be obtained by using steps 201 to 203. The following briefly describes a processing process shown in FIG. 8.

201: Transform the to-be-processed vertex data from the local coordinate system to the clip coordinate system to obtain the vertex data in the clip coordinate system.

The to-be-processed vertex data just obtained by the CPU is the data in the local coordinate system, and subsequent clipping and removal can be performed provided that the to-be-processed vertex data is transformed from the local coordinate system to the clip coordinate system.

202: Perform the clipping and removal operations on the vertex data in the clip coordinate system to obtain the vertex data within the field of view of the user.

It should be understood that, in 201, the vertex data may be directly transformed from the local coordinate system to the clip coordinate system through one time of coordinate transformation, or the vertex data may be transformed from the local coordinate system to the clip coordinate system through multiple times of coordinate transformation.

In this application, coordinate conversion may be performed on the vertex data in the local coordinate system by using different coordinate transformation manners. The following describes two possible transformation manners.

In a first processing manner, coordinate transformation is sequentially performed on the vertex data in the local coordinate system based on the auxiliary data to obtain the vertex data in the clip coordinate system.

In the first manner, a specific process in which the CPU performs coordinate transformation on a vertex in the local coordinate system includes:

(1) sequentially transforming the vertex data in the local coordinate system from the local coordinate system to a world coordinate system, a viewer coordinate system, and the clip coordinate system to obtain the vertex data in the clip coordinate system; and (2) performing the clipping and removal operations on the vertex data in the clip coordinate system to obtain the vertex data within the field of view of the user.

In the first manner, the auxiliary data may include a model matrix, a view matrix (or may also be referred to as a viewer matrix), and a projection matrix. These matrices are matrices that match the vertex data obtained by the CPU, and the vertex data that is in the local coordinate system and that is obtained by the CPU can be transformed to the clip coordinate system by using these matrices.

Coordinates of the vertex data in the world coordinate system may also be referred to as world space coordinates. The world space coordinates of the vertex data are space coordinates of the vertex data relative to a world origin and are coordinates in a larger space range. Vertex data in the world coordinate system is placed together with that of another object relative to the world origin. If an operation needs to be performed on the vertex data relative to a location of another object, it makes more sense to do the operation in the world coordinate system.

Coordinates of the vertex data in the viewer coordinate system may be referred to as viewer space coordinates, and the viewer space coordinates are coordinates obtained by viewing from an angle of a camera or a viewer.

Figure 9:
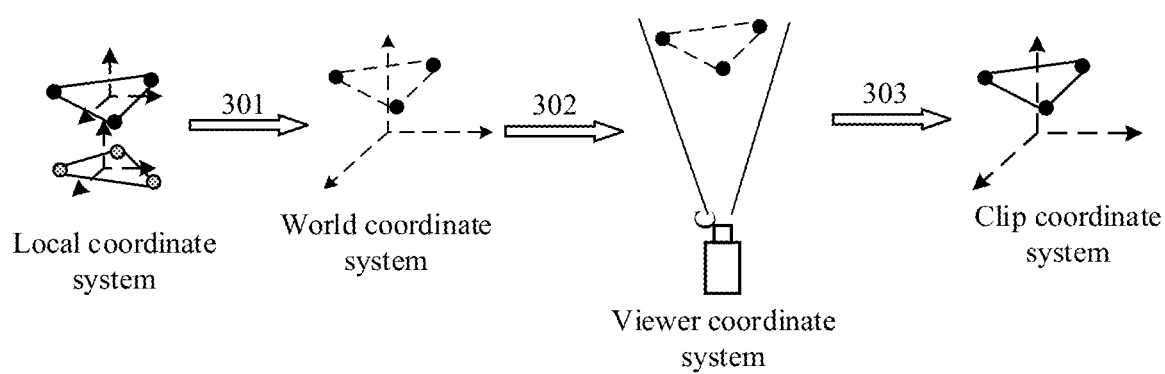
FIG. 9 is a schematic diagram of a process of performing coordinate transformation on vertex data.

To better describe the coordinate transformation process in the first manner, the following describes the coordinate transformation in the first manner with reference to FIG. 9.

As shown in FIG. 9, after the to-be-processed vertex data is obtained, the vertex data within the field of view of the user can be obtained by using steps 301 to 303. The following briefly describes a processing process shown in FIG. 9.

301: Transform the to-be-processed vertex data from the local coordinate system to the world coordinate system to obtain the vertex data in the world coordinate system.

In step 301, the vertex data in the local coordinate system may be multiplied by the model matrix to obtain the vertex data in the world coordinate system.

302: Transform the to-be-processed vertex data from the world coordinate system to the viewer coordinate system to obtain vertex data in the viewer coordinate system.

In step 302, the vertex data in the world coordinate system may be multiplied by the view matrix to obtain the vertex data in the viewer coordinate system.

303: Transform the to-be-processed vertex data from the viewer coordinate system to the clip coordinate system to obtain the vertex data in the clip coordinate system.

In step 303, the vertex data in the viewer coordinate system may be multiplied by the projection matrix to obtain the vertex data in the clip coordinate system.

In a second processing manner, one time of transformation is performed on the vertex data in the local coordinate system based on the auxiliary data to obtain the vertex data in the clip coordinate system.

Primitive data is multiplied by a model view projection matrix (model view projection matrix, MVP) to obtain primitive data in the clip coordinate system.

In the second manner, a specific process in which the CPU performs coordinate transformation on the vertex data in the local coordinate system includes:

(3) multiplying the vertex data in the local coordinate system by the model view projection matrix (model view projection matrix, MVP) to obtain the vertex data in the clip coordinate system; and (4) performing the clipping and removal operations on the primitive data in the clip coordinate system to obtain the vertex data within the field of view of the user.

In the second manner, the auxiliary data may include the MVP. The MVP is a matrix obtained by sequentially multiplying a model matrix, a view matrix, and a projection matrix.

The model matrix, the view matrix, and the projection matrix that are used to obtain the MVP are matrices that match the vertex data obtained by the CPU.

Figure 10:
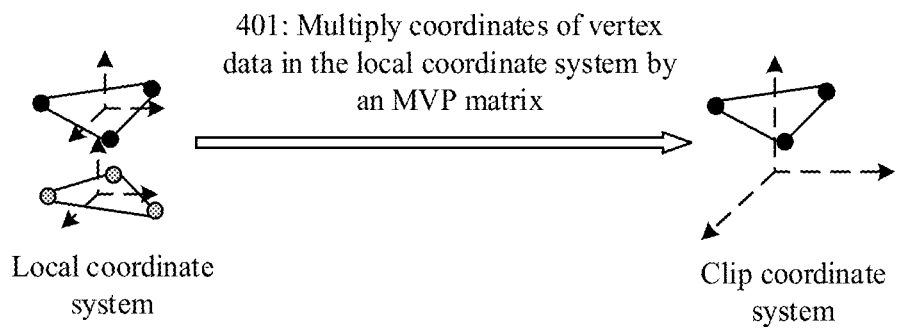
FIG. 10 is a schematic diagram of a process of performing coordinate transformation on vertex data.

To better describe the coordinate transformation process in the second manner, the following describes the coordinate transformation in the second manner with reference to FIG. 10.

As shown in FIG. 10, after the vertex data is obtained, the vertex data can be directly transformed from the local coordinate system to the clip coordinate system by using step 401. The following briefly describes a processing process shown in FIG. 10.

401: Multiply coordinates of the vertex data in the local coordinate system by the MVP matrix to obtain the vertex data in the clip coordinate system.

In this application, when the coordinate transformation is performed in the second processing manner, the vertex data can be transformed from the local coordinate system to the clip coordinate system through one time of coordinate transformation based on the MVP matrix, which can improve coordinate transformation efficiency.

In the second processing manner, the MVP matrix may be pre-obtained by the CPU. Specifically, the MVP matrix may be obtained by the CPU before the CPU performs coordinate transformation on the vertex data. In this way, when the coordinate transformation is performed based on the MVP matrix, time required for the coordinate transformation can be reduced.

It should be understood that, before the coordinate conversion is performed on the vertex data in the local coordinate system, vertex processing may be first performed on the vertex data in the local coordinate system.

The performing vertex processing on the vertex data in the local coordinate system may specifically include: combining the vertex data into a primitive based on a specified primitive type and index data (indices data) of the vertex data to obtain primitive data.

The vertex processing is completed after the primitive data is obtained. Next, primitive processing may be continued to be performed on the primitive data to obtain the vertex data within the field of view of the user.

In addition, before the primitive processing is performed on the primitive data, lighting transformation may be performed on a vertex location in the primitive data by using a vertex shader, and then the primitive processing is performed on processed primitive data.

It should be understood that, during the vertex processing, the primitive data may be finally obtained, and the primitive data may be considered as vertex data combined based on a specific shape. Therefore, the primitive data may also be considered as vertex data essentially. During the subsequent primitive processing of the primitive data, vertex data obtained after the vertex processing is processed essentially.

It should be understood that in this application, auxiliary data needs to be used when each of the vertex processing and the subsequent coordinate transformation is performed on the vertex data. Auxiliary data used when the vertex processing is performed on the vertex data is the index data (indices data) of the vertex data, and auxiliary data used when the coordinate transformation is performed on the vertex data may be referred to as the coordinate transformation matrix (uniform data).

103: The CPU sends the vertex data within the field of view of the user to the GPU for rendering processing.

The CPU and the GPU each may include multiple cores.

Optionally, the CPU and the GPU may be located in a same electronic device, or may be separately located in different electronic devices.

For example, both the CPU and the GPU are located in a same electronic device, and graphics rendering can be implemented through cooperation between the CPU and the GPU.

For another example, the CPU is located in a client device (for example, a terminal device) and the GPU is located in a cloud device (for example, a cloud server), and graphics rendering can be implemented through cooperation between the CPU in the client device and the cloud device. The CPU in the client device may first obtain the vertex data and process the vertex data, and then send the finally obtained vertex data within the field of view of the user to the GPU for rendering processing. Next, the client device may obtain a rendered graphic from the cloud device for display.

In this application, a processing process of the to-be-processed vertex data for which the GPU is originally responsible is transferred to the CPU for execution, which can reduce load of the GPU during graphics rendering and improve graphics rendering efficiency.

Optionally, that the CPU sends the vertex data within the field of view of the user to the GPU for rendering processing includes: the CPU stores the vertex data within the field of view of the user in the storage module, so that the GPU obtains the vertex data within the field of view of the user from the storage module and performs image rendering processing.

In this application, the CPU stores the processed vertex data within the field of view of the user in a memory, so that the GPU can obtain the vertex data within the field of view of the user from the cache module and then complete the subsequent graphics rendering processing.

Before processing the to-be-processed vertex data, the CPU may copy the to-be-processed vertex data from the memory. After processing the vertex data, the CPU replaces the to-be-processed vertex data stored in the memory with the vertex data within the field of view of the user.

Figure 11:
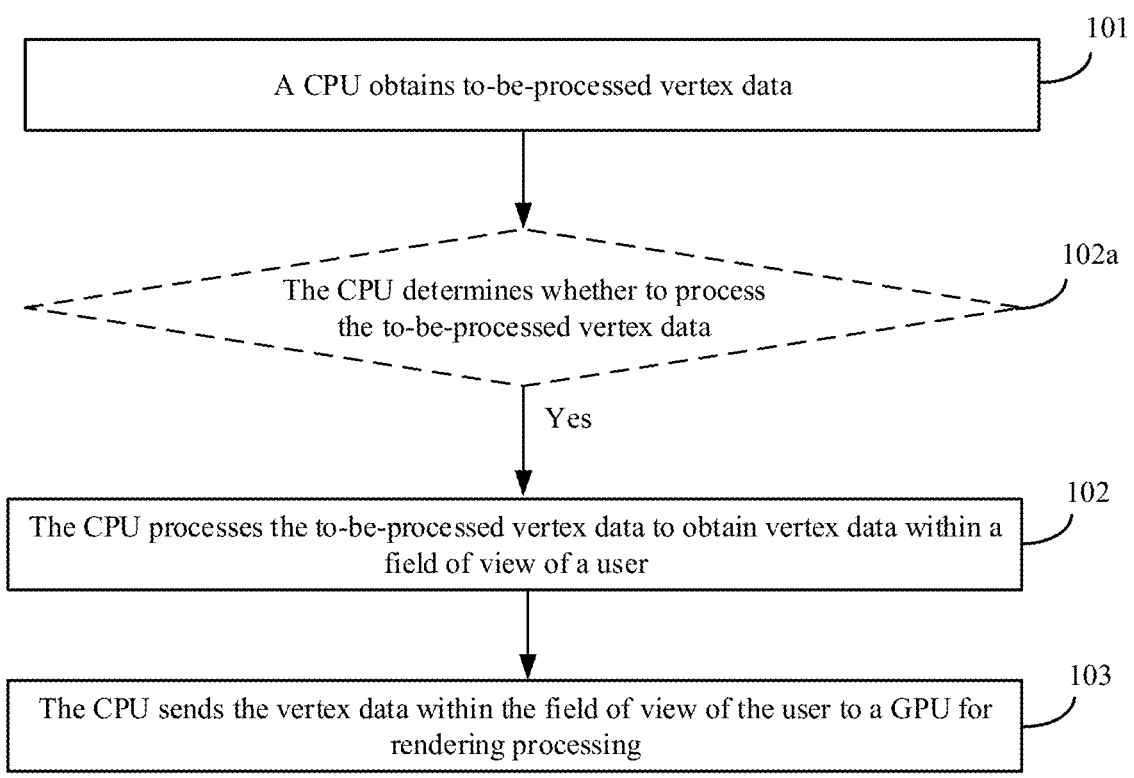
FIG. 11 is a schematic flowchart of a graphics rendering method according to an embodiment of this application.

Optionally, in an embodiment, as shown in FIG. 11, before step 102, the method shown in FIG. 7 further includes step 102a. The following describes step 102a.

102a: The CPU determines whether to process the to-be-processed vertex data.

It should be understood that, in step 102a, the CPU needs to determine whether the CPU needs to process the to-be-processed vertex data.

Specifically, in step 102a, the CPU may determine, based on at least one of the to-be-processed vertex data, a load amount of the CPU, and a load amount of the GPU, whether to process the vertex data.

After determining, in step 102a, to process the to-be-processed vertex data, the CPU continues to perform steps 102 and 103. After the CPU determines, in step 102a, not to process the to-be-processed vertex data, the GPU may continue to process the to-be-processed vertex data.

It should be understood that, the CPU may determine, based on at least one of an amount of the to-be-processed vertex data, a size of the load amount of the CPU, and a size of the load amount of the GPU, whether to process the to-be-processed vertex data.

The amount of the to-be-processed vertex data may be a quantity (an amount) of pieces of the to-be-processed vertex data. In addition, the amount of the to-be-processed vertex data may alternatively be a quantity of vertices corresponding to the vertex data.

Specifically, in step 102a, that the CPU determines, based on at least one of the to-be-processed vertex data, a load amount of the CPU, and a load amount of the GPU, whether to process the to-be-processed vertex data includes:

when at least one of the following cases occurs, the CPU determines to process the to-be-processed vertex data:

case A: the amount of the to-be-processed vertex data is greater than or equal to a first amount threshold;

case B: a current load amount of the CPU is less than a first load amount threshold; and case C: a current load amount of the GPU is greater than or equal to a second load amount threshold.

In this application, when the amount of the to-be-processed vertex data is relatively large, the to-be-processed vertex data is processed by the CPU, which can greatly reduce load of the GPU compared with a manner in which all the to-be-processed vertex data is processed by the CPU for processing.

The following describes the three cases in detail.

Case A: the amount of the to-be-processed vertex data is greater than or equal to the first amount threshold.

When the amount of the to-be-processed vertex data is relatively large, if the to-be-processed vertex data is directly processed by the GPU, relatively large load may be brought to the GPU (a larger amount of the to-be-processed vertex data usually indicates a larger corresponding operation amount). Therefore, when the amount of the to-be-processed vertex data is relatively large, processing of the to-be-processed vertex data is transferred to the CPU for processing, which can greatly reduce load of the GPU and achieve a more obvious load (or load amount) reduction effect for the GPU.

It should be understood that, when the amount of the to-be-processed vertex data is greater than or equal to the first amount threshold, it may be considered that the amount of the to-be-processed vertex data is (relatively) large. In this case, to reduce the load of the GPU, the to-be-processed vertex data may be processed by the GPU.

However, when the amount of the to-be-processed vertex data is less than the first amount threshold, it may be considered that the amount of the to-be-processed vertex data is (relatively) small. In this case, directly processing the to-be-processed vertex data by the GPU usually does not bring relatively large load to the GPU. In this case, the to-be-processed vertex data may be processed by the GPU.

Case B: the current load amount of the CPU is less than the first load amount threshold.

When the current load amount of the CPU is less than the first load amount threshold, it may be considered that the current load amount of the CPU is relatively small, and the to-be-processed vertex data may be processed by the CPU. In addition, when determining that the current load amount of the CPU is greater than or equal to the first load amount threshold, the CPU may consider that the current load amount of the CPU is relatively large. In this case, if the to-be-processed vertex data is processed by the CPU, relatively large load is brought to the CPU. Therefore, load statues of the CPU and the GPU may be comprehensively balanced. In this case, the to-be-processed vertex data may be processed by the GPU, so that load of the CPU is not excessively high, and the load of the CPU and load of the GPU is balanced as much as possible.

Optionally, the current load amount of the CPU is a current total load amount of the CPU.

The current total load amount of the CPU may be a sum of load amounts of all cores in the current CPU.

Optionally, the current load amount of the CPU is a current load amount of a CPU core.

The current load amount of the CPU core may be an average value of current load amounts of cores in the CPU, or may be a current load amount of any core in the CPU.

Specifically, when the current load amount of the CPU core is determined, the load amount of the CPU core may be calculated based on user mode execution time, system kernel execution time, and system idle time of the CPU core.

For example, the current load amount of the CPU core may be determined according to formula (1):

$$P=(X+Y)/Z \qquad (1)$$

X is the user mode execution time of the CPU core, Y is the system kernel execution time of the CPU core, Z is a sum of the user mode execution time, the system kernel execution time, and the system idle time of the CPU core, and P is the current load amount of the CPU core.

When the load amount of the CPU core is less than the first load amount threshold, it may be considered that the load amount of the CPU core is relatively small. In this case, the to-be-processed vertex data may be processed by the CPU.

The user mode execution time, the system kernel execution time, and the system idle time of the CPU core may be referred to as time allocation information of the CPU. For an Android (android) system, the time allocation information of the CPU core is stored in a /proc/stat file node, and current time allocation information of the CPU core may be obtained by querying/proc/stat. Similarly, for an IOS system, the time allocation information of the CPU core may also be obtained by searching a corresponding file node.

Case C: the current load amount of the GPU is greater than or equal to the second load amount threshold.

When the current load amount of the GPU is greater than the second load threshold, it may be considered that the current load amount of the GPU is relatively large. In this case, the to-be-processed vertex data may be processed by the CPU, to reduce load of the GPU.

Figure 12:
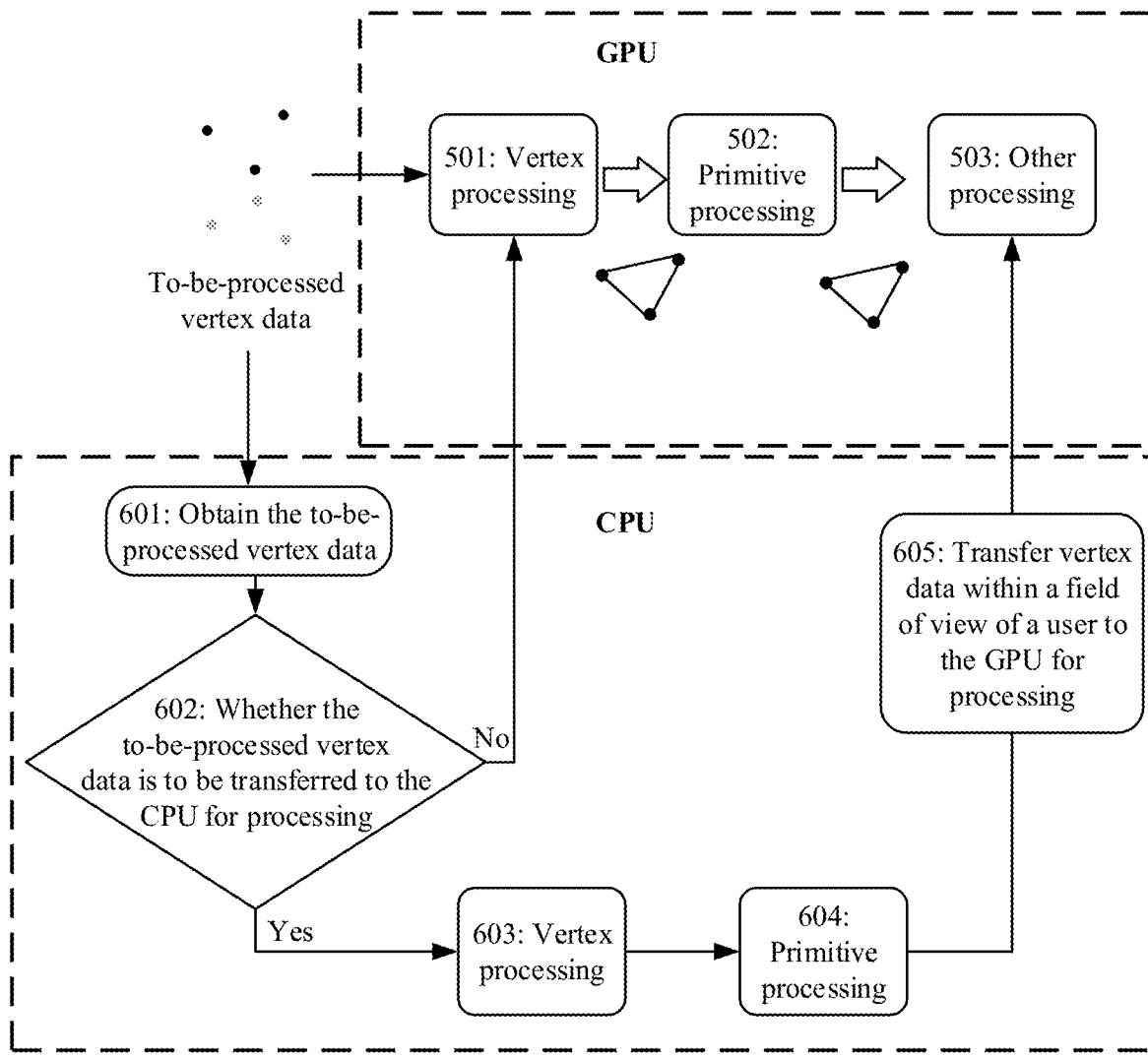
FIG. 12 is a schematic flowchart of a graphics rendering method according to an embodiment of this application.

To better understand the graphics rendering method in the embodiments of this application, the following describes the graphics rendering method in the embodiments of this application with reference to FIG. 12.

FIG. 12 shows a main processing process of a graphics rendering method according to an embodiment of this application.

Based on different entities for executing this method, the process shown in FIG. 12 may be divided into a process executed by a CPU and a process executed by a GPU. The process executed by the GPU mainly includes steps 501 to 503, and the process executed by the CPU mainly includes steps 601 to 604. The following separately describes these steps.

501: The GPU performs vertex processing on to-be-processed vertex data.

In step 501, the vertex data may be combined into a primitive based on a specified primitive type and index data (indices data) of the vertex data to obtain primitive data.

502: The GPU performs primitive processing on the to-be-processed vertex data obtained after the vertex processing.

The performing primitive processing in step 502 mainly includes performing coordinate transformation on the to-be-processed vertex data, and performing clipping and deletion operations on vertex data in a clip coordinate system to obtain vertex data within a field of view of a user.

The performing vertex processing and primitive processing in steps 501 and 502 is equivalent to processing the to-be-processed vertex data in step 102. A difference lies in that step 102 is executed by the CPU, and steps 501 and 502 are executed by the GPU.

503: The GPU performs other processing on the vertex data obtained after the primitive processing.

In step 503, the GPU may continue to perform processing such as rasterization processing, fragment processing, and fragment-by-fragment processing on the vertex data within the field of view of the user.

Steps 501 to 503 are a main process in which the GPU performs graphics rendering. If steps 501 to 503 are performed on all vertex data, relatively large load may be brought to the GPU. Therefore, a part of the vertex data may be processed by the CPU, to reduce load of the GPU.

601: The CPU obtains (collects) to-be-processed vertex data.

A process in which the CPU obtains the to-be-processed vertex data in step 601 is similar to the foregoing process of obtaining the to-be-processed vertex data in step 101. Details are not described herein again.

602: The CPU determines whether the obtained to-be-processed vertex data is to be transferred to the CPU for processing.

Specifically, the CPU may determine, based on one or more factors of an amount of the to-be-processed vertex data, a current load amount of the CPU, and a current load amount of the GPU, whether the vertex data is to be transferred to the CPU for processing.

Specifically, the CPU may determine, when any one of the following cases occurs (case A, case B, or case C occurs), to transfer the obtained to-be-processed vertex data to the CPU for processing:

case A: the amount of the to-be-processed vertex data is greater than or equal to a first amount threshold;

case B: the current load amount of the CPU is less than a first load amount threshold; and case C: the current load amount of the GPU is greater than or equal to a second load amount threshold.

In addition, the CPU may determine, only when the three cases all occur, to transfer the obtained to-be-processed vertex data to the CPU for processing. For example, the CPU may determine, only when case A, case B, and case C all occur, to transfer the obtained to-be-processed vertex data to the CPU for processing. In addition, the CPU may alternatively determine, only when case A and case B both occur (or when case B and case C both occur, or when case A and case C both occur), to transfer the obtained to-be-processed vertex data to the CPU for processing.

603: The CPU performs vertex processing on the to-be-processed vertex data.

604: The CPU performs primitive processing on to-be-processed vertex data obtained after the vertex processing.

Step 603 and step 604 are equivalent to the foregoing processing process in step 102, and specific processes of the vertex processing and primitive processing are described above, and are not described herein in detail again.

605: The CPU transfers vertex data within a field of view of a user to the GPU for processing.

In this application, when the CPU is used to process the to-be-processed vertex data, the CPU may allocate the to-be-processed vertex data to different cores for processing. The following uses an example in which the CPU has M (M is a positive integer) cores, to describe in detail various cases in which a core in the CPU processes the to-be-processed vertex data.

In a first case, the CPU allocates the to-be-processed vertex data to a single core for processing.

In the first case, that the CPU allocates the to-be-processed vertex data to a single core in the CPU for processing includes: the CPU allocates the to-be-processed vertex data to a core with a smallest current load amount in the M cores of the CPU for processing.

The to-be-processed vertex data is allocated to the core with the smallest current load amount in the CPU for processing, which can balance load of the cores in the CPU, so that load of a specific core is not excessively high.

In addition, in the first case, alternatively, the to-be-processed vertex data may be allocated to a single core for processing when the amount of the to-be-processed vertex data is less than a second amount threshold.

When the amount of the to-be-processed vertex data is less than the second amount threshold, it may be considered that the amount of the to-be-processed vertex data is not particularly large. In this case, the to-be-processed vertex data can be processed by the single core in the CPU.

In a second case, the CPU allocates the to-be-processed vertex data to N of the M cores for processing.

In the second case, N is a positive integer greater than 1 and less than or equal to M.

In the second case, the to-be-processed vertex data may be allocated to the multiple cores in the CPU for processing. The to-be-processed vertex data is allocated to the multiple cores in the CPU for processing, which can balance load amounts of all the cores, and avoid an excessively large load amount of a single core as much as possible.

In addition, in the second case, a current average load amount of the N cores is less than a current average load amount of N-M cores, and the N-M cores are cores other than the N cores in the CPU.

A current load amount of any one of the N cores is less than a current load amount of any one of the N-M cores, and the N-M cores are cores other than the N cores in the CPU.

In other words, in the second case, the to-be-processed vertex data may be allocated to a core with a relatively small current load amount for processing, which can implement load balancing between all the cores in the CPU, so that load of some cores is not excessively high.

Figure 13:
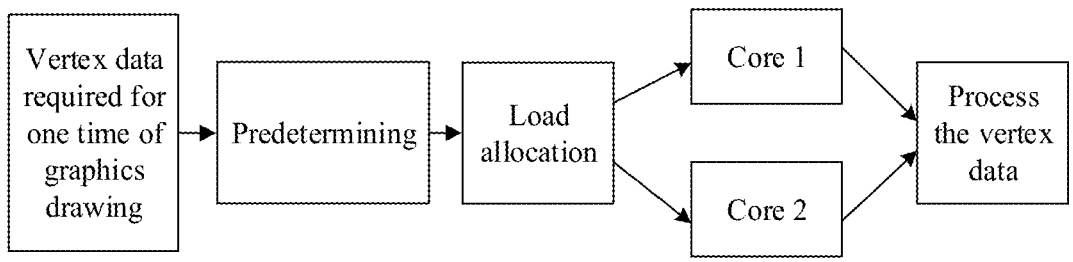
FIG. 13 is a schematic diagram of a process in which a CPU allocates vertex data to cores in the CPU for processing.

To better understand a process in which the CPU allocates the to-be-processed vertex data to the multiple cores for processing, with reference to FIG. 13, the following uses an example in which the CPU allocates the to-be-processed vertex data to two cores for processing, to describe the process in which the CPU allocates the to-be-processed vertex data to the multiple cores for processing.

As shown in FIG. 13, the CPU obtains vertex data (vertex data corresponding to a draw call) required for one time of graphics drawing, then predetermines whether the CPU needs to process the vertex data, and performs load allocation when determining that the CPU is to process the vertex data, to allocate the vertex data to a core 1 and a core 2 in the CPU for processing. Next, the core 1 and the core 2 separately process the vertex data.

It should be understood that, in FIG. 13, when obtaining the vertex data required for one time of graphics drawing, the CPU further needs to obtain index data of the vertex data and a transformation matrix to process the vertex data.

In FIG. 13, the CPU performs the pre-determining process to determine whether the CPU is to process the vertex data. For a specific determining process, refer to the foregoing related content of step 102a.

In addition, in the process shown in FIG. 13, the core 1 and the core 2 may be two cores each with a smallest current load amount in the CPU (current load amounts of other cores in the CPU are all greater than or equal to the current load amount of each of the core 1 and the core 2). When allocating the vertex data to the core 1 and the core 2 for processing, the CPU may evenly allocate the vertex data to the core 1 and the core 2 for processing.

The graphics rendering method in the embodiments of this application may be applied to a game scenario (to render a video picture in a game). To better understand the graphics rendering method in the embodiments of this application, with reference to accompanying drawings, the following uses an example in which a terminal device runs a game, to describe the graphics rendering method in the embodiments of this application in detail.

Figure 14:
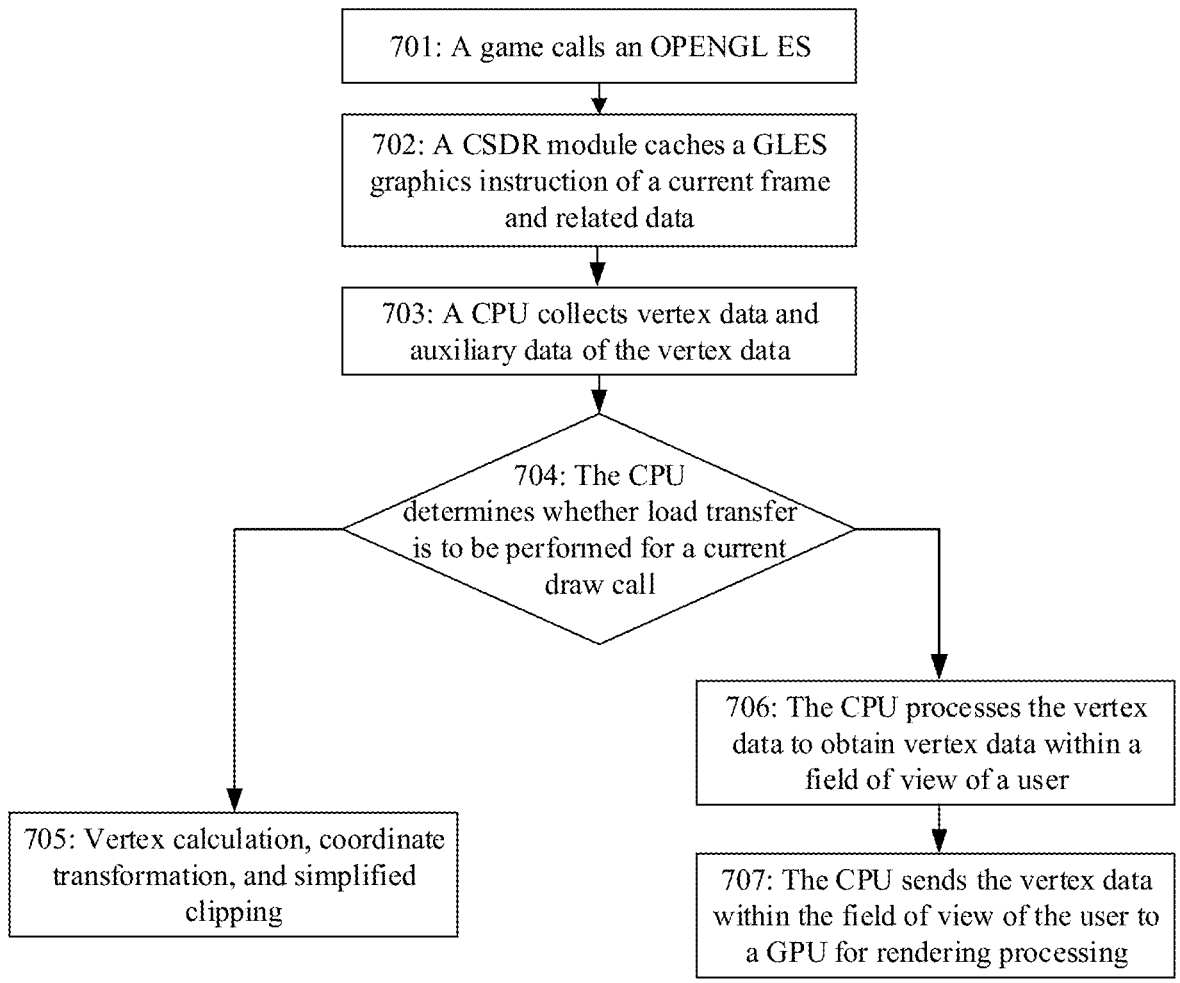
FIG. 14 is a schematic flowchart of a graphics rendering method according to an embodiment of this application.

FIG. 14 shows a processing process of a graphics rendering method according to an embodiment of this application in a game scenario. The method shown in FIG. 14 may be executed by an electronic device (or another electronic device that can present a game picture).

The process shown in FIG. 14 includes steps 701 to 707. The following describes these steps in detail.

701: A game application calls a cross-platform graphics application programming interface for embedded systems (open graphics library for embedded systems, OPENGL ES). Specifically, in a game running process (a game picture drawing process), the game application continuously calls an API interface in the OPENGL ES graphics library, to draw a picture required by a game for display.

702: A command stream dynamic reconstruction (command stream dynamic reconstruction, CSDR) module caches a GLES graphics instruction of a current frame and related data.

The related data in step 702 may include vertex data on which rendering processing is to be performed. In the game running process, a graphics instruction for calling a graphics application programming interface for embedded systems (graphics library for embedded systems, GLES) is cached by the CSDR module. The CPU may obtain the cached GLES graphics instruction and vertex data from the CSDR module for analysis, to determine whether the CPU is to process the vertex data.

703: The CPU collects the vertex data and auxiliary data of the vertex data.

In step 703, the CPU may obtain the vertex data and the auxiliary data of the vertex data from the CSDR module. The auxiliary data includes index data of the vertex data and a transformation matrix for performing coordinate transformation on the vertex data.

It should be understood that an improvement in this embodiment of this application compared with an existing solution lies in that the interface between the CPU and the CSDR module is added. The interface between the CPU and the CSDR module is added, so that the CPU can process the vertex data, and send vertex data that is within a field of view of a user and that is obtained by the CPU through processing to the CSDR, so that the GPU can subsequently process the vertex data within the field of view of the user.

704: The CPU determines whether load transfer is to be performed for vertex data corresponding to a current draw call.

In step 704, the vertex data corresponding to the draw call is vertex data required for one time of graphics drawing, and the determining whether load transfer is to be performed for vertex data is essentially determining whether the CPU is to process the vertex data (when the CPU is to process the vertex data, the load transfer needs to be performed; or when the CPU is not to process the vertex data, the load transfer does not need to be performed).

When it is determined, in step 704, that the load transfer is not to be performed, the vertex data is still processed by the GPU; in other words, step 705 is performed; or when it is determined, in step 705, that the load transfer needs to be performed, the vertex data is processed by the CPU; in other words, steps 706 and 707 are performed.

705: The GPU processes the vertex data.

For a process in which the GPU processes the vertex data in step 705, refer to the foregoing steps 501, 502, and 503.

706: The CPU processes the vertex data to obtain the vertex data within the field of view of the user.

707: The CPU sends the vertex data within the field of view of the user to the GPU for rendering processing.

For specific processing processes of steps 706 and 707, refer to the foregoing related content of steps 102 and 103.

Figure 15:
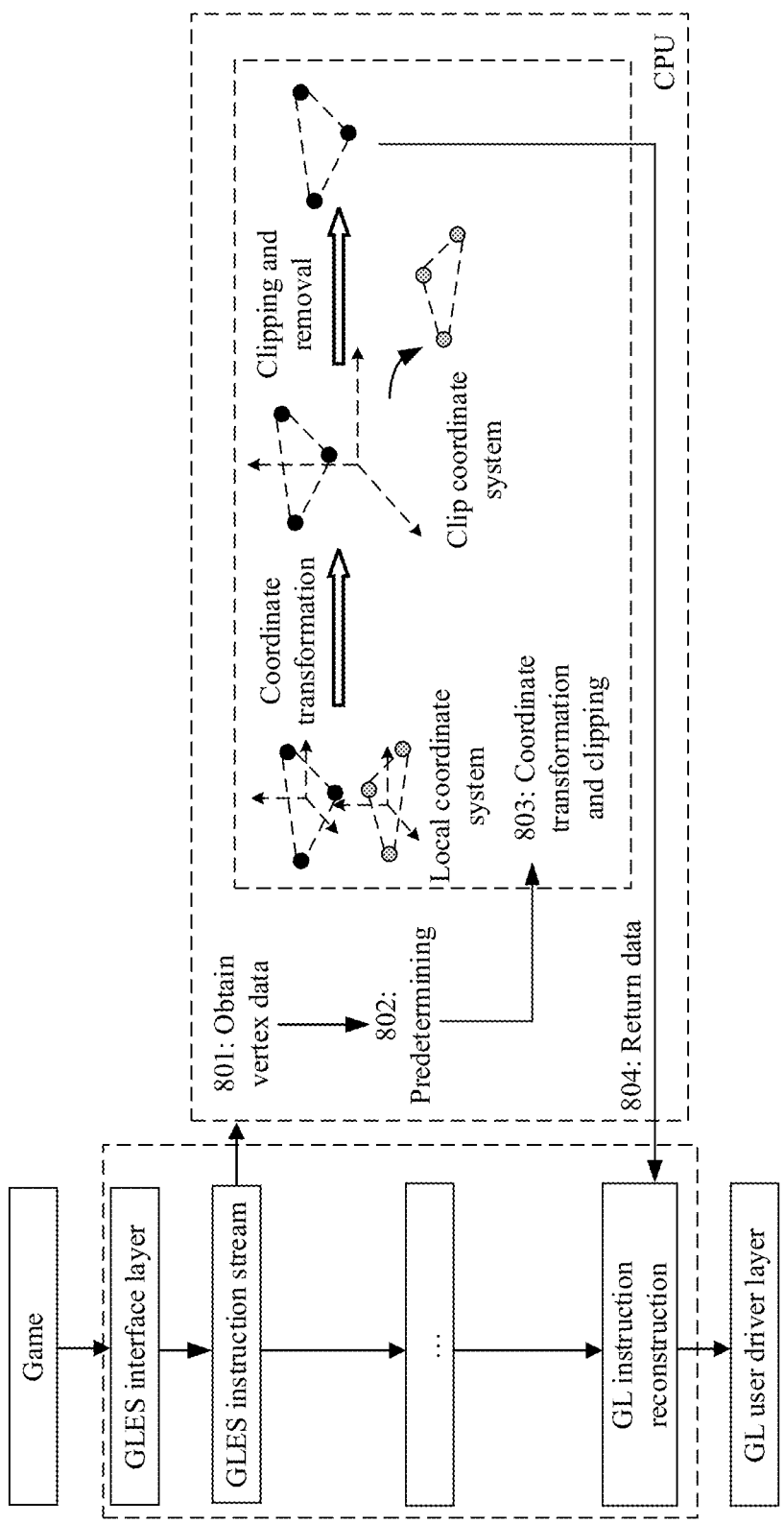
FIG. 15 is a schematic flowchart of a graphics rendering method according to an embodiment of this application.

To better describe the processing process of the graphics rendering method according to this embodiment of this application in the game scenario, the following describes the graphics rendering method according to this embodiment of this application in the game scenario with reference to FIG. 15.

FIG. 15 shows a processing process of a graphics rendering method according to an embodiment of this application in a game scenario. The method shown in FIG. 15 may be executed by an electronic device (or another electronic device that can present a game picture).

The process shown in FIG. 15 includes steps 801 to 804. The following separately describes these steps.

801: A CPU obtains vertex data from a GLES instruction stream.

The GLES instruction stream includes a graphics rendering instruction and a parameter carried in the instruction. The parameter includes vertex data corresponding to the graphics rendering instruction. Therefore, the CPU may obtain the vertex data from the GLES instruction stream.

802: The CPU predetermines whether the CPU is to process the vertex data.

The CPU performs the pre-determining mainly to determine whether the CPU is to process the obtained vertex data. For a specific determining process, refer to the foregoing related content of 102*a*. Details are not described herein again.

When the CPU determines, in step 802, that a GPU is to process the vertex data, the CPU does not process the obtained vertex data. In this case, the CPU may continue to obtain vertex data, and continue to perform step 802 after obtaining vertex data next time. If the CPU determines, in step 802, that the CPU is to process the vertex data, the CPU continues to perform steps 803 and 804.

803: The CPU performs coordinate transformation, and clipping and removal on the vertex data to obtain vertex data within a field of view of a user.

In step 803, for a specific process in which the CPU obtains the vertex data within the field of view of the user, refer to the foregoing related content of step 102.

804: The CPU sends the vertex data within the field of view of the user to a graphics application programming interface (graphics library, GL) instruction group.

Specifically, in step 804, after obtaining the vertex data within the field of view of the user, the CPU may send the vertex data within the field of view of the user to the GL instruction group, and replace the vertex data in the GLES instruction stream. Next, the GPU can be driven by using a GL user driver layer, so that the GPU can obtain the vertex data within the field of view of the user and perform subsequent rendering processing on the vertex data within the field of view of the user.

The foregoing describes the graphics rendering method in the embodiments of this application in detail with reference to FIG. 7 to FIG. 15. The following describes a graphics rendering apparatus in the embodiments of this application in detail with reference to FIG. 16. It should be understood that the graphics rendering apparatus in FIG. 16 can execute the steps of the graphics rendering method in the embodiments of this application. The following appropriately omit repeated descriptions when describing the graphics rendering apparatus shown in FIG. 16.

Figure 16:
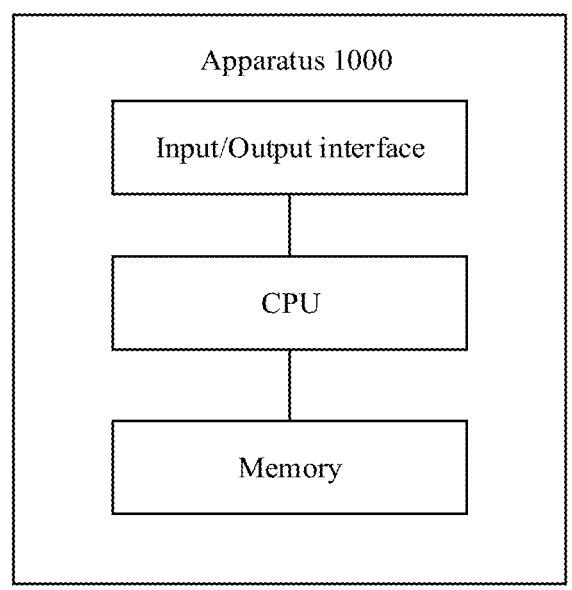
FIG. 16 is a schematic block diagram of a graphics rendering apparatus according to an embodiment of this application.

FIG. 16 is a schematic block diagram of a graphics rendering apparatus according to an embodiment of this application.

An apparatus 1000 shown in FIG. 16 includes an input/output interface, a memory, and a CPU.

The memory is configured to store a program. When the program stored in the memory is executed by the CPU, the CPU is specifically configured to:

obtain to-be-processed vertex data by using the input/output interface, where the to-be-processed vertex data is vertex data used by a GPU (the GPU may be located inside the apparatus 1000 or may be located inside another apparatus) for graphics rendering processing; process the to-be-processed vertex data to obtain vertex data within a field of view of a user; and send the vertex data within the field of view of the user to the GPU for graphics rendering processing.

In this application, a processing process of the to-be-processed vertex data for which the GPU is originally responsible is transferred to the CPU for execution, which can reduce load of the GPU during graphics rendering and improve graphics rendering efficiency.

The apparatus 1000 may further include the GPU. The CPU in the apparatus 1000 can obtain the to-be-processed vertex data originally processed by the GPU in the apparatus 1000, process the to-be-processed vertex data to obtain the vertex data within the field of view of the user, and send the vertex data within the field of view of the user to the GPU in the apparatus 1000 for processing.

Figure 17:
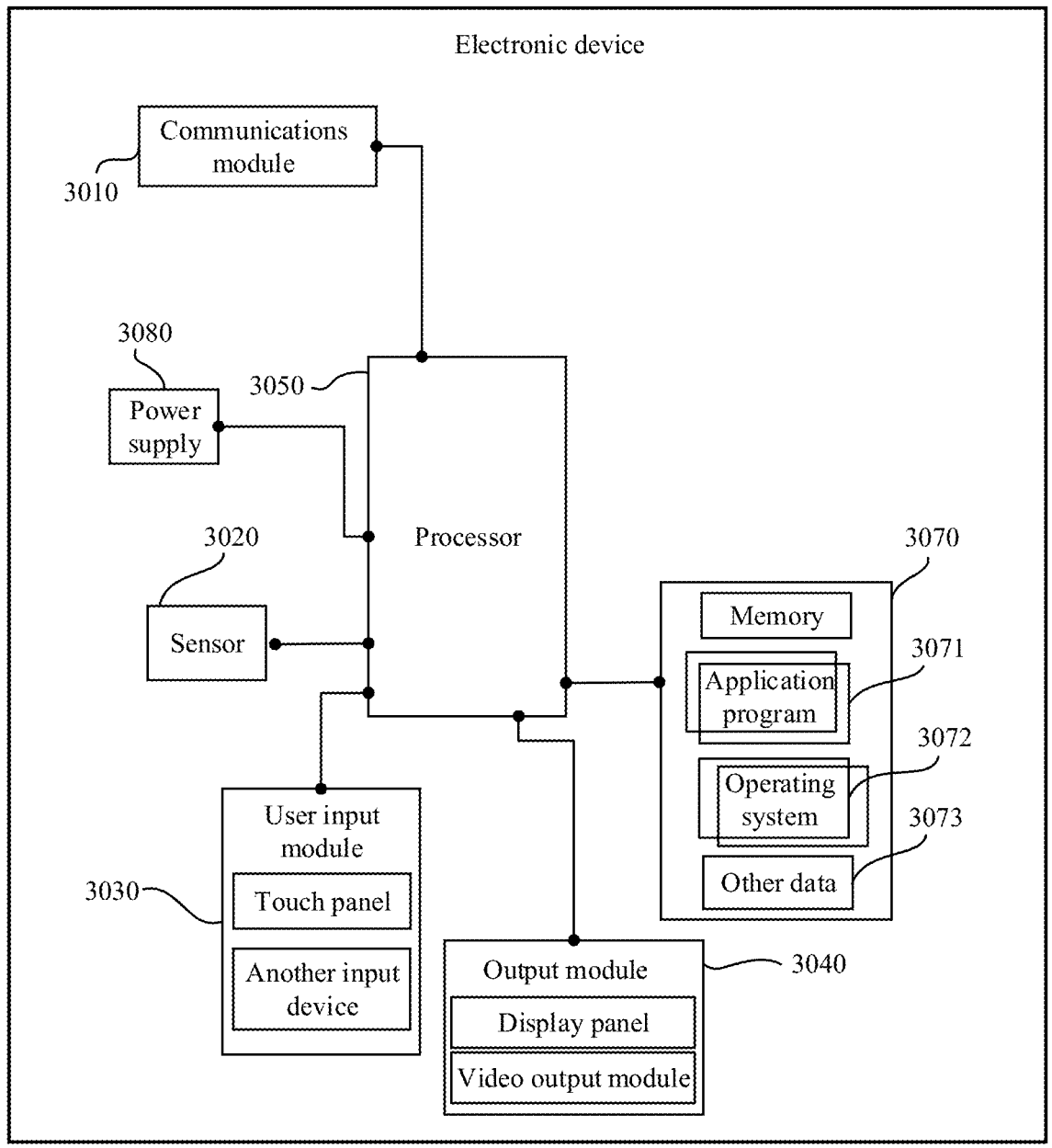
FIG. 17 is a schematic block diagram of an electronic device according to an embodiment of this application.

FIG. 17 is a schematic structural diagram of an electronic device according to an embodiment of this application.

It should be understood that a specific structure of the apparatus 1000 shown in FIG. 16 may be shown in FIG. 17.

The electronic device in FIG. 17 includes a communications module 3010, a sensor 3020, a user input module 3030, an output module 3040, a processor 3050, a memory 3070, and a power supply 3080. The processor 3050 may include one or more CPUs.

The electronic device shown in FIG. 17 may execute the steps of the graphics rendering method in the embodiments of this application. Specifically, the one or more CPUs in the processor 3050 may execute the steps of the graphics rendering method in the embodiments of this application.

The following describes the modules in the electronic device in FIG. 17 in detail.

The communications module 3010 may include at least one module that enables the electronic device to communicate with another electronic device. For example, the communications module 3010 may include one or more of a wired network interface, a broadcast receiving module, a mobile communications module, a wireless Internet module, a local area communications module, a location (or positioning) information module, and the like.

For example, the communications module 3010 can obtain a game picture from a game server end in real time.

The sensor 3020 may sense some operations of a user, and the sensor 3020 may include a distance sensor, a touch sensor, and the like. The sensor 3020 may sense an operation that, for example, the user touches a screen or approaches the screen. For example, the sensor 3020 can sense some operations of the user in a game interface.

The user input module 3030 is configured to: receive entered digital information or characteristic information, or a contact touch operation/contactless gesture, and receive signal input related to user settings and function control of the system, and the like. The user input module 3030 includes a touch panel and/or another input device. For example, the user may control a game by using the user input module 3030.

The output model 3040 includes a display panel, configured to display information entered by the user, information provided for the user, various menu interfaces of the system, and the like.

Optionally, the display panel may be configured in a form of a liquid crystal display (liquid crystal display, LCD), an organic light-emitting diode (organic light-emitting diode, OLED), or the like. In some other embodiments, the touch panel may cover the display panel to form a touch display screen.

In addition, the output model 3040 may further include a video output model, an alarm, a tactile module, and the like.

The video output module may display a game picture obtained after graphics rendering.

The power supply 3080 may receive external power and internal power under control of the processor 3050, and supply power required for running of the components in the whole electronic device.

The processor 3050 may include the one or more CPUs, and the processor 3050 may further include one or more GPUs.

When the processor 3050 includes multiple CPUs, the multiple CPUs may be integrated into a same chip, or may be separately integrated into different chips.

When the processor 3050 includes multiple GPUs, the multiple GPUs may be integrated into a same chip, or may be separately integrated into different chips.

When the processor 3050 includes both the CPU and the GPU, the CPU and the GPU may be integrated into a same chip.

For example, when the electronic device shown in FIG. 17 is a smartphone, one CPU and one GPU are usually related to image processing in a processor in the smartphone. The CPU and the GPU herein each may include multiple cores.

The memory 3070 may store a computer program, and the computer program includes an operating system program 3072, an application program 3071, and the like. A typical operating system is, for example, a system used in a tablet computer or a notebook computer, such as Windows of Microsoft or MacOS of Apple, and for another example, a system used in a mobile terminal, such as a Linux®-based Android (Android®) system developed by Google.

The memory 3070 may be one or more of the following types: a flash (flash) memory, a hard disk-type memory, a micro multimedia card memory, a card memory (for example, an SD or XD memory), a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 3070 may alternatively be a network storage device in the Internet. The system may perform an operation such as updating or reading on the memory 3070 in the Internet.

For example, the memory 3070 may store a computer program (the computer program is a program corresponding to the graphics rendering method in the embodiments of this application). When the processor 3050 executes the computer program, the processor 3050 can execute the graphics rendering method in the embodiments of this application.

The memory 3070 further stores other data 3073 in addition to the computer program. For example, the memory 3070 may store data in a processing process of the graphics rendering method in this application.

A connection relationship between the modules in FIG. 17 is only an example. The electronic device provided in any embodiment of this application may also be applied to an electronic device using another connection manner. For example, all modules are connected by using a bus.

A person of ordinary skill in the art may be aware that, the units and algorithm steps in the examples described with reference to the embodiments disclosed in this specification can be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiments are merely examples. For example, the unit division is merely logical function division, and there may be another division manner during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units; in other words, may be located in one location, or may be distributed on a plurality of network units. Some or all of the units may be selected based on an actual requirement to achieve the objectives of the solutions of the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to execute all or some steps of the method in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A graphics rendering method, comprising:
    obtaining, by a central processing unit (CPU), to-be-processed vertex data, wherein the to-be-processed vertex data is vertex data used by a graphics processing unit (GPU) for graphics rendering processing;
    determining, by the CPU, an amount of the to-be-processed vertex data is greater than or equal to a first amount threshold;
    determining, by the CPU in response to determining the amount of the to-be-processed vertex data is greater than or equal to the first amount threshold, the CPU is to process the to-be-processed vertex data to obtain vertex data within a field of view of a user;
    refraining, by the CPU in response to determining the CPU is to process the to-be-processed vertex data, from sending the to-be-processed vertex data to the GPU;
    processing, by the CPU, the to-be-processed vertex data in response to determining the CPU is to process the to-be-processed vertex data to obtain the vertex data within the field of view of the user; and
    sending, by the CPU, the vertex data within the field of view of the user to the GPU for the graphics rendering processing.

2. The method according to claim 1, wherein
the obtaining, by the CPU, of the to-be-processed vertex data comprises:
    obtaining, by the CPU, the to-be-processed vertex data from a storage module; and
the sending, by the CPU, of the vertex data within the field of view of the user to the GPU for the rendering processing comprises:
    storing, by the CPU, the vertex data within the field of view of the user in the storage module, so that the GPU obtains the vertex data within the field of view of the user from the storage module and performs the image rendering processing.

3. The method according to claim 1, wherein the to-be-processed vertex data is vertex data captured by one draw call instruction used to render one image frame.

4. The method according to claim 1, wherein the to-be-processed vertex data is vertex data in a local coordinate system, and the processing, by the CPU, of the to-be-processed vertex data to obtain the vertex data within the field of view of the user comprises:
    performing, by the CPU, coordinate conversion on the vertex data in the local coordinate system based on auxiliary data to obtain vertex data in a clip coordinate system, wherein the auxiliary data comprises a transformation matrix for performing coordinate transformation on the vertex data in the local coordinate system; and
    performing, by the CPU, clipping and removal operations on the vertex data in the clip coordinate system to obtain the vertex data within the field of view of the user.

5. The method according to claim 4, wherein the auxiliary data comprises a model view projection (MVP) matrix, and the performing, by the CPU, of the coordinate conversion on the vertex data in the local coordinate system based on the auxiliary data to obtain the vertex data in the clip coordinate system comprises:
    performing, by the CPU, coordinate conversion on the vertex data in the local coordinate system based on the MVP matrix to obtain the vertex data in the clip coordinate system,
    wherein the MVP matrix is a product of a model matrix, a view matrix, and a projection matrix.

6. The method according to claim 1, wherein the CPU comprises M cores, and the processing, by the CPU, of the to-be-processed vertex data comprises:

based on a determination that the amount of the to-be-processed vertex data is less than a second amount threshold, allocating, by the CPU, the to-be-processed vertex data to a single core in the CPU for processing; or based on a determination that the amount of the to-be-processed vertex data is greater than or equal to the second amount threshold, allocating, by the CPU, the to-be-processed vertex data to N cores in the CPU for processing, wherein both M and N are integers greater than 1, and N is less than or equal to M.

7. The method according to claim 6, wherein a current average load amount of the N cores is less than a current average load amount of the cores included in the M cores that are other than the N cores in the CPU.

8. The method according to claim 6, wherein the allocating, by the CPU, of the to-be-processed vertex data to the single core in the CPU for processing comprises:

allocating, by the CPU, the to-be-processed vertex data to a core with a smallest current load amount in the CPU for processing.

9. A graphics rendering apparatus, comprising a central processing unit (CPU) and a graphics processing unit (GPU), wherein the CPU is configured to:

obtain to-be-processed vertex data, wherein the to-be-processed vertex data is vertex data used by the GPU for graphics rendering processing;

determine an amount of the to-be-processed vertex data is greater than or equal to a first amount threshold;

determine, in response to determining the amount of the to-be-processed vertex data is greater than or equal to a first amount threshold, the CPU is to process the to-be-processed vertex data to obtain vertex data within a field of view of a user;

refrain from sending the to-be-processed vertex data to the GPU in response to determining the CPU is to process the to-be-processed vertex data;

process the to-be-processed vertex data in response to determining the CPU is to process the to-be-processed vertex data to obtain the vertex data within the field of view of the user; and send the vertex data within the field of view of the user to the GPU for the graphics rendering processing.

10. The apparatus according to claim 9, wherein the CPU is configured to:

obtain the to-be-processed vertex data from a storage module; and store the vertex data within the field of view of the user in the storage module, so that the GPU obtains the vertex data within the field of view of the user from the storage module and performs the image rendering processing.

11. The apparatus according to claim 9, wherein the to-be-processed vertex data is vertex data captured by one draw call instruction used to render image frame.

12. The apparatus according to claim 9, wherein the to-be-processed vertex data is vertex data in a local coordinate system, and the CPU is configured to:

perform coordinate conversion on the vertex data in the local coordinate system based on auxiliary data to obtain vertex data in a clip coordinate system, wherein the auxiliary data comprises a transformation matrix for performing coordinate transformation on the vertex data in the local coordinate system; and perform clipping and removal operations on the vertex data in the clip coordinate system to obtain the vertex data within the field of view of the user.

13. The apparatus according to claim 12, wherein the auxiliary data comprises a model view projection (MVP) matrix, and the CPU is configured to:

perform coordinate conversion on the vertex data in the local coordinate system based on the MVP matrix to obtain the vertex data in the clip coordinate system, wherein the MVP matrix is a product of a model matrix, a view matrix, and a projection matrix.

14. The graphics rendering apparatus according to claim 9, wherein the CPU comprises M cores, and the processing of the to-be-processed vertex data comprises:

based on a determination that the amount of the to-be-processed vertex data is less than a second amount threshold, allocating the to-be-processed vertex data to a single core in the CPU for processing; or based on a determination that the amount of the to-be-processed vertex data is greater than or equal to the second amount threshold, allocating the to-be-processed vertex data to N cores in the CPU for processing, wherein both M and N are integers greater than 1, and N is less than or equal to M.

15. The graphics rendering apparatus according to claim 14, wherein a current average load amount of the N cores is less than a current average load amount of the cores included in the M cores that are other than the N cores in the CPU.

16. A non-transitory computer-readable storage medium having instructions stored thereon that, when executed by a central processing unit (CPU) and a graphics processing unit (GPU), cause the CPU and the GPU to:

obtain, by the CPU, to-be-processed vertex data, wherein the to-be-processed vertex data is vertex data used by the GPU for graphics rendering processing;

determine, by the CPU, an amount of the to-be-processed vertex data is greater than or equal to a first amount threshold;

determine, by the CPU in response to determining the amount of the to-be-processed vertex data is greater than or equal to the first amount threshold, the CPU is to process the to-be-processed vertex data to obtain vertex data within a field of view of a user;

refrain, by the CPU in response to determining the CPU is to process the to-be-processed vertex data, from sending the to-be-processed vertex data to the GPU;

process, by the CPU, the to-be-processed vertex data in response to determining the CPU is to process the to-be-processed vertex data to obtain the vertex data within the field of view of the user; and send, by the CPU, the vertex data within the field of view of the user to the GPU for the graphics rendering processing.

17. The non-transitory computer-readable storage medium according to claim 16, wherein the CPU is caused to obtain the to-be-processed vertex data by:

obtaining the to-be-processed vertex data from a storage module; and the CPU is caused to send the vertex data within the field of view of the user to the GPU for the rendering processing by:

storing the vertex data within the field of view of the user in the storage module, so that the GPU obtains the vertex data within the field of view of the user from the storage module and performs the image rendering processing.

18. The non-transitory computer-readable storage medium according to claim 16, wherein the to-be-processed vertex data is vertex data captured by one draw call instruction used to render one image frame.

19. The non-transitory computer-readable storage medium according to claim 16, wherein the CPU comprises M cores, and the processing, by the CPU, of the to-be-processed vertex data comprises:
- based on a determination that the amount of the to-be-processed vertex data is less than a second amount threshold, allocating, by the CPU, the to-be-processed vertex data to a single core in the CPU for processing; or
- based on a determination that the amount of the to-be-processed vertex data is greater than or equal to the second amount threshold, allocating, by the CPU, the to-be-processed vertex data to N cores in the CPU for processing,
- wherein both M and N are integers greater than 1, and N is less than or equal to M.

20. The non-transitory computer-readable storage medium according to claim 19, wherein a current average load amount of the N cores is less than a current average load amount of the cores included in the M cores that are other than the N cores in the CPU.

* * * * *